US012590494B2

(12) United States Patent
Zhang et al.

(10) Patent No.: US 12,590,494 B2
(45) Date of Patent: Mar. 31, 2026

(54) DRILLING TOOL HAVING PRE-FABRICATED COMPONENTS

(71) Applicant: Schlumberger Technology Corporation, Sugar Land, TX (US)

(72) Inventors: Youhe Zhang, Spring, TX (US); Mingdong Cai, Cypress, TX (US); Sudarsanam Chellappa, Houston, TX (US); Huimin Song, Spring, TX (US); Ting Ren, Conroe, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/738,189

(22) Filed: Jun. 10, 2024

(65) Prior Publication Data

US 2024/0328261 A1      Oct. 3, 2024

Related U.S. Application Data

(62) Division of application No. 17/151,306, filed on Jan. 18, 2021, now Pat. No. 12,006,773.

(60) Provisional application No. 62/961,985, filed on Jan. 16, 2020, provisional application No. 62/962,000, filed on Jan. 16, 2020.

(51) Int. Cl.
| | |
|---|---|
| *E21B 10/46* | (2006.01) |
| *B22D 19/06* | (2006.01) |
| *B22D 23/06* | (2006.01) |
| *B33Y 80/00* | (2015.01) |

(52) U.S. Cl.
CPC .............. *E21B 10/46* (2013.01); *B22D 19/06* (2013.01); *B22D 23/06* (2013.01); *B33Y 80/00* (2014.12)

(58) Field of Classification Search
CPC ................................ B22D 19/06; B22D 23/06
See application file for complete search history.

(56) References Cited

U.S. PATENT DOCUMENTS

| | | | | |
|---|---|---|---|---|
| 3,726,351 | A | * 4/1973 | Williams, Jr. .......... | E21B 10/54 407/53 |
| 6,073,518 | A | * 6/2000 | Chow .................... | B22D 23/06 419/27 |
| 6,148,936 | A | 11/2000 | Evans | |

(Continued)

FOREIGN PATENT DOCUMENTS

| | | |
|---|---|---|
| EP | 3061545 A1 | 8/2016 |

*Primary Examiner* — Cathleen R Hutchins
(74) *Attorney, Agent, or Firm* — Kyle R. Miiller

(57) ABSTRACT

The disclosed drill tools have metal matrix composite (MMC) or steel alloy bodies that are formed around one or more pre-fabricated components using either a casting or infiltration process. The pre-fabricated components are made of sintered, infiltrated, and/or cemented particles of an ultrahard material, and may form any suitable portion of the bit blades. The pre-fabricated components may be loaded into a machined mold, and the mold cavity is subsequently filled with powder, such as tungsten carbide powder, filler metal powder, binder metal powder, or combinations thereof. During a casting or infiltration process, the mold and pre-fabricated components are heated to a sufficient temperature to melt the binder metal and/or filler metal, wherein the molten metal superficially interacts with the inner surfaces of the pre-fabricated components to form a metallurgical bond to secure the pre-fabricated components to the bit body.

16 Claims, 20 Drawing Sheets

(56)                    References Cited

U.S. PATENT DOCUMENTS

| | | | |
|---|---|---|---|
| 6,209,420 | B1 | 4/2001 | Butcher |
| 6,220,117 | B1 * | 4/2001 | Butcher ................ C22C 1/1015 |
| | | | 175/425 |
| 7,878,275 | B2 | 2/2011 | Lockwood et al. |
| 8,312,941 | B2 | 11/2012 | Mirchandani et al. |
| 8,347,990 | B2 | 1/2013 | Lockwood et al. |
| 8,459,382 | B2 | 6/2013 | Aliko et al. |
| 8,757,297 | B2 | 6/2014 | Aliko et al. |
| 8,789,625 | B2 | 7/2014 | Mirchandani et al. |
| 9,068,408 | B2 | 6/2015 | Vempati et al. |
| 9,579,717 | B2 | 2/2017 | Vempati et al. |
| 10,029,301 | B2 | 7/2018 | Cook, III et al. |
| 10,337,257 | B2 | 7/2019 | Zhang |
| 10,471,507 | B2 | 11/2019 | Thomas et al. |
| 10,641,045 | B2 | 5/2020 | Cook, III et al. |
| 10,655,397 | B2 | 5/2020 | Cook, III et al. |
| 2010/0193255 | A1 | 8/2010 | Stevens |
| 2013/0320598 | A1 | 12/2013 | Atkins et al. |
| 2015/0041222 | A1 | 2/2015 | Eason |
| 2016/0369568 | A1 | 12/2016 | Cook, III |
| 2017/0121230 | A1 * | 5/2017 | Zhang ................ C04B 35/5626 |
| 2018/0058148 | A1 * | 3/2018 | Zhang .................... B22F 10/16 |
| 2019/0128072 | A1 | 5/2019 | Griffo |
| 2020/0001367 | A1 * | 1/2020 | Duffy .................... B22F 10/00 |
| 2020/0047253 | A1 | 2/2020 | Thomas et al. |
| 2020/0123858 | A1 | 4/2020 | Zhang et al. |
| 2021/0222497 | A1 | 7/2021 | Zhang |

* cited by examiner

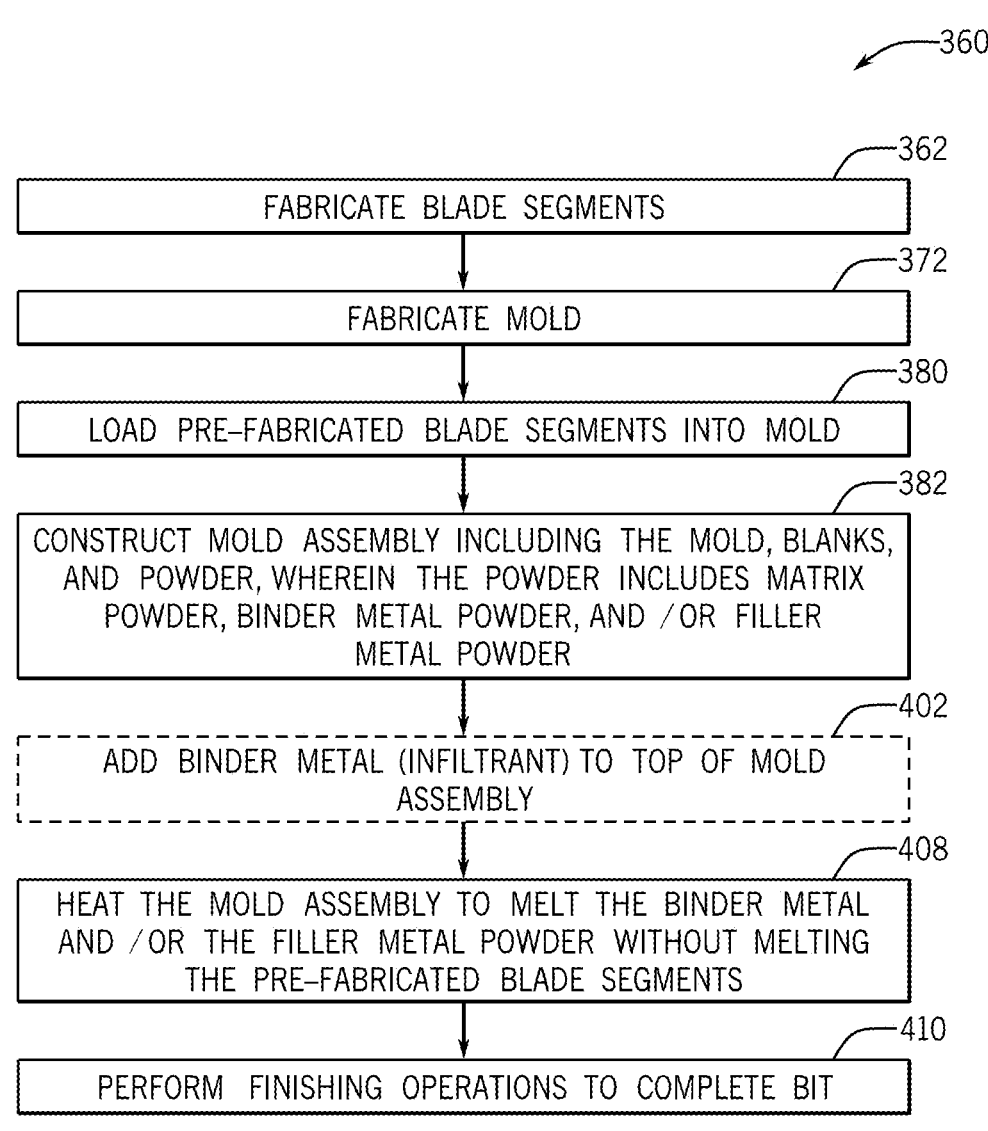

—360

—362
FABRICATE BLADE SEGMENTS

—372
FABRICATE MOLD

—380
LOAD PRE-FABRICATED BLADE SEGMENTS INTO MOLD

—382
CONSTRUCT MOLD ASSEMBLY INCLUDING THE MOLD, BLANKS, AND POWDER, WHEREIN THE POWDER INCLUDES MATRIX POWDER, BINDER METAL POWDER, AND /OR FILLER METAL POWDER

—402
ADD BINDER METAL (INFILTRANT) TO TOP OF MOLD ASSEMBLY

—408
HEAT THE MOLD ASSEMBLY TO MELT THE BINDER METAL AND /OR THE FILLER METAL POWDER WITHOUT MELTING THE PRE-FABRICATED BLADE SEGMENTS

—410
PERFORM FINISHING OPERATIONS TO COMPLETE BIT

FIG. 5

DRILLING TOOL HAVING PRE-FABRICATED COMPONENTS

CROSS-REFERENCE TO RELATED APPLICATIONS

This application is a divisional of and claims the benefit of, and priority to, U.S. patent application Ser. No. 17/151, 306, now U.S. Pat. No. 12,006,773, entitled "Drilling Tool Having Pre-Fabricated Components" filed on Jan. 18, 2021 which claims the benefit of and priority to U.S. Patent Application No. 62/961,985 entitled "Drilling Tool Having Pre-Fabricated Segments" filed Jan. 16, 2020, and U.S. Patent Application No. 62/962,000 entitled "Drilling Tool Having A Pre-Fabricated Shell" filed Jan. 16, 2020, all of which are incorporated herein by this reference in their entirety.

BACKGROUND

The present disclosure relates generally to drilling tools and, more specifically, to drilling tools manufactured via a combination of a first manufacturing process (e.g., an additive manufacturing process) and a casting or infiltration process.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Wellbores may be drilled into a surface location or sea bed for a variety of exploratory or extraction purposes. For example, a wellbore may be drilled to access fluids, such as liquid and gaseous hydrocarbons, stored in subterranean formations and to extract the fluids from the formations. A variety of drilling methods and tools may be utilized depending partly on the characteristics of the formation through which the wellbore is drilled.

A drilling system may use a variety of bits in the creation, maintenance, extension, and abandonment of a wellbore. Bits include drilling bits, mills, reamers, hole openers, and other cutting tools. Some drilling systems rotate a bit relative to the wellbore to remove material from the sides and/or bottom of the wellbore. Some bits are used to remove natural material from the surrounding geologic formation to extend or expand the wellbore. For instance, so-called fixed cutter or drag bits, or roller cone bits, may be used to drill or extend a wellbore, and a reamer or hole opener may be used to remove formation materials to extend or widen a wellbore. Some bits are used to remove material positioned in the wellbore during construction or maintenance of the wellbore. For example, bits are used to remove cement, scale, or metal casing from a wellbore during maintenance, creation of a window for lateral drilling in an existing wellbore, or during remediation.

During drilling of a wellbore, cutting tools such as drill bits and underreamers are used to remove material from the earth to extend or enlarge the wellbore. The cutting tools include cutting elements that may experience wear or damage during the cutting operations. Damaged or lost cutting elements can reduce the effectiveness of the cutting tool and slow or stop work on the wellbore. Additionally, the cutting elements of the cutting tool may reach the end of their operational lifetime before the body of the cutting tool itself.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments are directed to drilling tools, such as drill bits, as well as methods of manufacturing thereof. The disclosed bits have metal matrix composite (MMC) or steel bodies that are formed around one or more pre-fabricated, high-density components (e.g., blade segments, shell) using either a casting or infiltration process. The pre-fabricated components can form the blades of the bit, an entirety of a bit blade, or particular portions of the blade. For example, in certain embodiments, the pre-fabricated blade segments form the front and top of each bit blade and secure the cutting elements of the bit, which reduces bit erosion and enhances the operational lifetime of the bit. In certain embodiments, the pre-fabricated blade segments form the front, top, and rear of each bit blade and secure the cutting elements of the bit. The components (e.g., shell, blade segments) are made of sintered, infiltrated, and/or cemented particles of an ultrahard material, such as tungsten carbide or cast tungsten carbide ($WC/W_2C$) with a metallic binder system. In certain embodiments, the pre-fabricated components may be fabricated using an additive manufacturing technique, such as direct layer melting (DLM), an electron beam melting (EBM) manufacturing process, or a binder-jet additive manufacturing process that includes a further heat/pressure treatment or infiltration step.

After fabrication, the pre-fabricated components (e.g., shell, blade segments) are loaded into a machined mold, sand displacements may be added to the mold to define fluid channels within the bit, one or more steel blanks may be added, and the remainder of the mold cavity is filled with one or more types of powders. In certain embodiments, the powders may include matrix powders (e.g., ultrahard materials, such as $WC/W_2C$ or steel matrix powder), filler metal (e.g., steel alloy powder), binder metal (e.g., copper or nickel alloy powders), or combinations thereof. During the casting or infiltration process, the assembled mold is heated to a sufficient temperature to melt a binder metal and/or a filler metal, wherein the molten metal superficially interacts with the inner surfaces of the pre-fabricated components to form a metallurgical bond (e.g., a permanent or non-removable attachment) to secure the pre-fabricated components to the bit body.

By fabricating the drill bit in this manner, a number of different advantages can be realized. Unlike traditional bits, because the outer surfaces of the blades of the drill bit are formed from one or more pre-fabricated components, it is recognized that the hardness and toughness of these outer surfaces is not dependent on the quality of the casting or infiltration process used to form the bit body. Additionally, using pre-fabricated components and a sufficiently low-melting steel alloy powder, an embodiment of a drill bit may be manufactured in which the one or more pre-fabricated components enable the desired hardness and erosion resistance to the surface of the bit, while the entirely steel bit body offers toughness and ductility, and is substantially cheaper to produce than a MMC bit body. Additionally, unlike MMC bit bodies, the steel alloy bit bodies of such embodiments are both machinable and weldable, which may reduce costs and increase the flexibility of the bit to be modified or customized for particular applications. In another embodiment, using the one or more pre-fabricated components, a matrix powder (e.g., an ultrahard material powder), and a binder metal (e.g., a lower melting copper or nickel alloy), an embodiment of a bit may be manufactured in which the one or more pre-fabricated components enable the desired hardness and toughness to the surface of the bit, while the MMC bit body enables enhanced hardness and erosion resistance relative to the embodiment with the steel alloy bit body.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 5 is a flow diagram illustrating a process for manufacturing a bit, in accordance with embodiments of the present technique;

DETAILED DESCRIPTION

Figure 1:
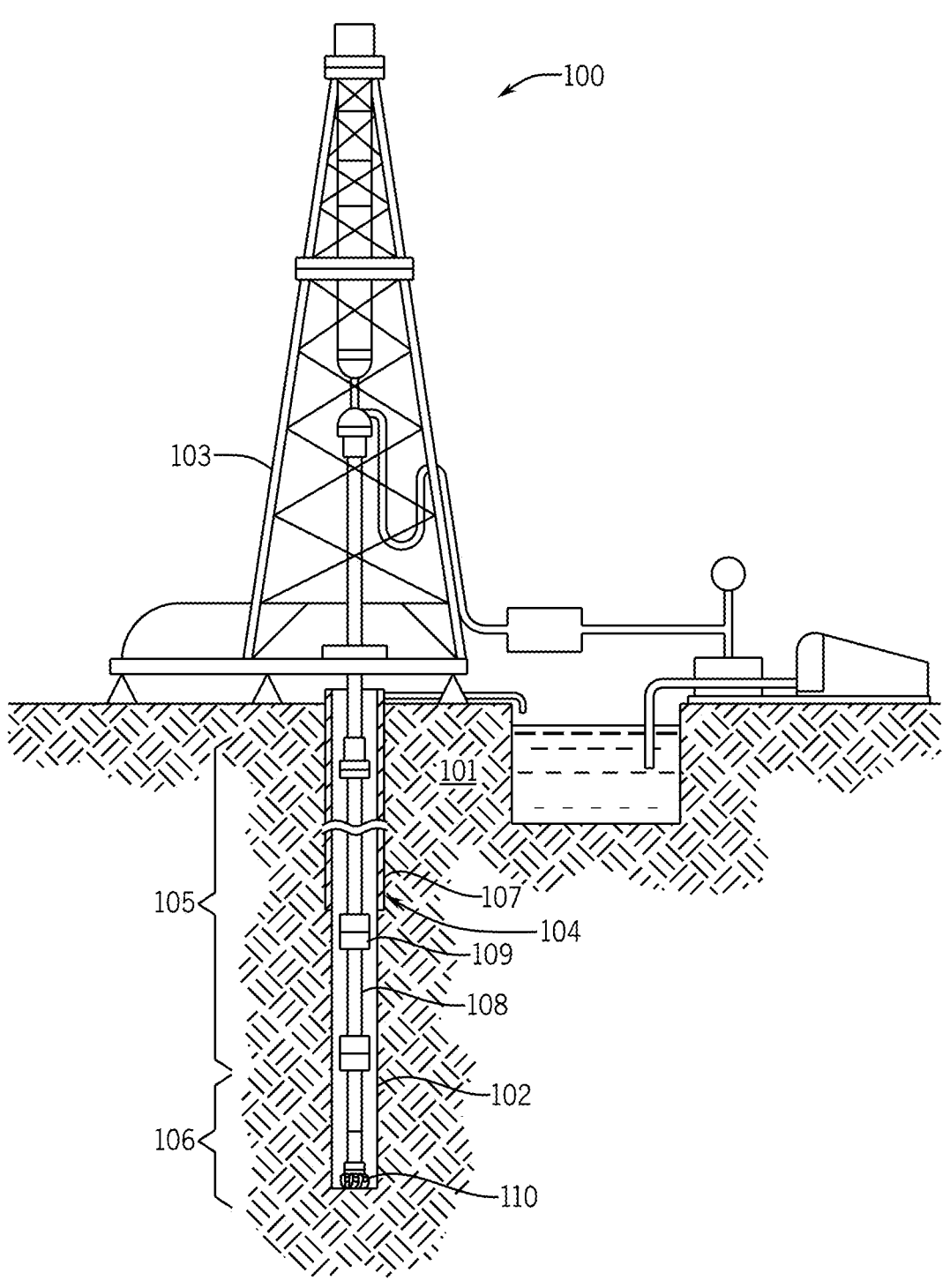
FIG. 1 is a schematic view of a drilling system, in accordance with embodiments of the present technique.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Additionally, some embodiments of this disclosure generally relate to a drill bit. While a drill bit for cutting through an earth formation is described herein, it should be understood that the present disclosure may be applicable to other bits such as mills, reamers, hole openers, and other bits used in downhole or other applications.

Bit bodies are generally fabricated from either alloyed steel or a metal matrix composite (MMC) material. The matrix material can include particles of a hard, refractory material that are bonded together by a binder metal using an infiltration process. MMC bit bodies may have higher wear or erosion resistance, but may sacrifice toughness and may be more susceptible to impact damage than steel bit bodies. The infiltration process involves the introduction of a refractory compound into a mold. The refractory may include a carbide of tungsten, titanium, or tantalum, or other specialized use materials. A slug or cubes of binder metal, also referred to as infiltrant, are then placed against the refractory compound at the opening. The binder metal may include a transition metal, such as iron, nickel, or copper, as well as alloys thereof (e.g., a copper alloy including nickel, manganese, zinc, and/or tin). The mold, refractory compound, and binder metal are placed into a furnace, and heated to above the melting point of the binder metal. By capillary action and gravity, the molten metal from the slug infiltrates the refractory compound in the mold, thereby binding the refractory compound into a part upon cooling.

Cutting elements on a bit may be formed of an ultrahard material, such as a tungsten carbide (WC, $W_2C$) or polycrystalline diamond (PCD). PCD may be used in various drilling operations as the material is very hard and wear resistant. PCD is, however, susceptible to thermal degradation during operations. Polycrystalline diamond compact (PDC) cutters are known in the art for use in earth-boring drill bits. Typically, bits using PDC cutters include an integral bit body which may be made of steel or fabricated from a MMC material composed of tungsten carbide and a metal binder. PDC cutters are mounted along the exterior face of blades of the bit body. Each PDC cutter has a portion which is brazed in a recess or pocket formed in the blade. The PDC cutters are positioned along the leading edges of the bit body blades so that as the bit body is rotated, the PDC cutters engage and drill the earth formation. In use, high forces may be exerted on the PDC cutters. Additionally, the bit and the PDC cutters may be subjected to substantial abrasive forces. In some instances, impact, vibration, and erosive forces have caused drill bit failure due to loss of one or more cutters, or due to breakage of the blades.

While steel body bits may have toughness and ductility properties that make them resistant to cracking and failure as a result of impact forces generated during drilling, steel is more susceptible than matrix material to abrasive and erosive wear caused by high-velocity drilling fluids and abrasive particles. The abrasive particles may include portions of the formation carried by drilling fluids, as well as sand, rock cuttings, and the like. Generally, portions of steel body PDC bits are coated with a more erosion-resistant material, such as tungsten carbide hardfacing, to improve erosion resistance. A tungsten carbide and other erosion-resistant hardfacing materials are, however, relatively brittle, and the hardfacing coverage is generally not very close to cover the vicinity around the cutter pockets due to the complicated geometries and a manual operation in most cases. During use, the fluids with abrasive particles potentially erode the body under the hardfacing, and near the cutter pockets, which can lead to the hardfacing cracking, spalling, peeling off, or wearing, thereby further exposing the softer steel body, which can then erode. This can lead to loss of PDC cutters as the area around the cutter is eroded away quickly. Other methods such as laser hardfacing are not very practical on finished bit, as this process is time consuming and costly.

Tungsten carbide MMC body bits have higher wear and erosion resistance as compared to steel bit bodies. Bit bodies formed from WC or other metal matrix materials, while more erosion resistant than steel, lack toughness and strength, thus making them brittle and prone to cracking when subjected to impact and fatigue forces encountered during drilling. This can result in one or more blades cracking or even breaking off from the bit. The formation and propagation of cracks in the matrix body may result in the loss of one or more PDC cutters. A lost cutter may abrade against the bit, causing further accelerated bit damage. Bits formed without tungsten carbide may, however, have sufficient toughness and strength for particular applications, but may lack other properties, such as hardness and erosion resistance. Thus, previous efforts have instead relied on combinations of materials to achieve a balance of properties.

As mentioned, certain conventional metal matrix composite (MMC) bit bodies are made via an infiltration process in which tungsten carbide (WC, $W_2C$) particles are metallurgically bonded by a binder metal at higher temperature. However, it is presently recognized that the process is time intensive, and that tungsten carbides are an expensive component of the process. Further, while the matrix that results from copper infiltration of $WC/W_2C$ particles or other forms of refractory carbide, such as sintered $WC/W_2C$ pellets with cobalt (overall referred to as the $WC/W_2C+Cu$ alloy matrix) is abrasively hard, it is also brittle and lacks thermal toughness. As such, the $WC/W_2C+Cu$ alloy matrix tends to crack when going through multiple repairs involving heat, such as when brazing cutting elements. Even under normal service conditions, the $WC/W_2C+Cu$ alloy matrix can generate cracks under mechanical loading. One approach to improving the properties of a matrix bit includes a layered approach in which a first type of powdered material (e.g., rich in $WC/W_2C$ powder) is layered close to the surface of the mold, while a second type of powdered material (e.g., rich in a steel alloy), is used to fill another portion of the mold, and then the various layers of powder in the mold are infiltrated with a copper-based binder metal. However, for bits made in this manner, even though the top layers of bit body surfaces may offer improved material properties relative to the remainder of the bit, the quality of the top layers is heavily dependent on and limited by the quality of the infiltration process and the nature of the infiltrant. As such, it is recognized that there remains a need for improved drill bit designs, as well as methods of manufacturing such bits.

With the foregoing in mind, present embodiments are directed to drilling tools and methods of manufacturing thereof. The disclosed bits have MMC or steel bodies that are formed against one or more pre-fabricated components (e.g., shell, blade segments) using either a casting or infiltration process. The pre-fabricated blade segments may form the full length of the bit blades, a partial length of the bit blades, and/or particular surfaces of the bit blades (e.g., the fronts of the bit blades, the tops of the bit blades, the back of the bit blades, or combinations thereof). The pre-fabricated shell generally forms the crown of the bit, and in some embodiments, may include flow passages and/or fluid outlets. The one or more pre-fabricated components (e.g., shell, blade segments) are made of sintered, infiltrated, and/or cemented particles of an ultrahard material, such as $WC+W_2C$ or sintered $WC/W_2C+cobalt$ (Co) pellets. The one or more pre-fabricated components are pre-fabricated using a suitable manufacturing technique that yields a high density part (e.g., 90% or greater). For example, in certain embodiments, the one or more pre-fabricated components may be manufactured via an additive manufacturing technique, such as an electron-beam melting additive manufacturing process or a binder-jet additive manufacturing process that includes a sintering or infiltration step. After being fabricated, the one or more pre-fabricated components may be loaded into a machined mold, sand/graphite displacements and steel blanks may be added to the mold to define fluid channels and other connecting parts within the bit body for connecting to an upper section (e.g., connecting to drill string), and then the remainder of the mold cavity is filled with one or more types of powders, such as matrix powders, filler metal powders, binder metal powders, or combinations thereof. In some embodiments, the one or more pre-fabricated shell may be loaded into a holder, sand/graphite displacements and steel blanks may be added to the shell to define fluid channels and other connecting parts within the bit body for connecting to an upper section, and then the remainder of the mold cavity is filled with one or more types of powders. During the casting or infiltration process, the assembled mold or holder is heated to a sufficient temperature to melt a binder metal and/or filler metal, wherein the molten metal then forms a metallurgical bond (e.g., a permanent or non-removable attachment) with the inner surfaces of the one or more pre-fabricated components to secure the one or more pre-fabricated components to the remainder of the bit.

It is presently recognized that the high-density, prefabricated components (e.g., shell, blade segments) are substantially impenetrable by the molten binding or filler metal during the casting or infiltration process, meaning that the molten binding or filler metal only superficially penetrates the inner surface of the pre-fabricated components. However, despite this limited superficial penetration, it is presently recognized that the one or more pre-fabricated components are securely integrated into the bit body using the disclosed manufacturing process. Further, the pre-fabricated components could be built with surface features such as cavities or protrusions to aid the bonding between the one or more pre-fabricated components and the infiltrated body. Additionally, unlike traditional MMC drill bits, because the certain outer surfaces of the components of the drill bit are formed from a pre-fabricated, high-density, ultrahard material, it is recognized that the properties (e.g., hardness, toughness, erosion resistance, etc.) of these outer surfaces is not reduced as a result of imperfection or irregularities in the casting or infiltration process used to form the bit body.

By fabricating a drilling tool in this manner, a number of different advantages can be realized. For example, using one or more pre-fabricated components and a sufficiently low-melting steel alloy powder, an embodiment of a bit may be manufactured in which the one or more pre-fabricated components enable the desired hardness and erosion resistance to the surface of the bit, while the steel bit body offers toughness and ductility, and is substantially cheaper to produce than a MMC bit body. Additionally, unlike MMC bit bodies, the steel alloy bit bodies of such embodiments are both machinable and weldable, which may reduce costs and increase the flexibility of the bit to be modified or customized for particular applications. In another embodiment, using the one or more pre-fabricated components, a suitable matrix powder (e.g., $WC/W_2C$, steel powder), and a suitable binder metal (e.g., a lower melting copper or nickel alloy), an embodiment of a bit may be manufactured in which the one or more pre-fabricated components enable the desired hardness and toughness to the surface of the bit, while the MMC bit body enables enhanced hardness and erosion resistance relative to the embodiment with the steel alloy bit body.

With the foregoing in mind, FIG. 1 shows one example of a drilling system 100 for drilling an earth formation 101 to form a wellbore 102. The drilling system 100 includes a drill rig 103 used to support and rotate a drilling tool assembly 104 that extends downward into the wellbore 102. The drilling tool assembly 104 may include a drill string 105, a bottomhole assembly ("BHA") 106, and a bit 110, attached to the downhole end of drill string 105.

The drill string 105 may include several joints of drill pipe 108 a connected end-to-end through tool joints 109. The drill string 105 transmits drilling fluid through a central bore and transmits rotational power from the drill rig 103 to the BHA 106. In some embodiments, the drill string 105 further includes additional components, such as subs, pup joints, and so forth. The drill pipe 108 provides a hydraulic passage through which drilling fluid is pumped from the surface. The drilling fluid discharges through nozzles, jets, or other orifices in the bit 110 and/or the BHA 106 for the purposes of cooling the bit 110 and cutting structures thereon, and for transporting cuttings out of the wellbore 102.

The BHA 106 may include the bit 110 or other components. An example BHA 106 may include additional or other components (e.g., coupled between to the drill string 105 and the bit 110). Examples of additional BHA components include drill collars, stabilizers, measurement-while-drilling ("MWD") tools, logging-while-drilling ("LWD") tools, downhole motors, underreamers, section mills, hydraulic disconnects, jars, vibration or dampening tools, other components, or combinations of the foregoing. The bit 110 may also include other cutting structures in addition to or other than a drill bit, such as milling or underreaming tools. In general, the drilling system 100 may include other drilling components and accessories, such as make-up/break-out devices (e.g., iron roughnecks or power tongs), valves (e.g., kelly cocks, blowout preventers, and safety valves), other components, or combinations of the foregoing. Additional components included in the drilling system 100 may be considered a part of the drilling tool assembly 104, the drill string 105, or a part of the BHA 106 depending on their locations in the drilling system 100.

The bit 110 in the BHA 106 may be any type of bit suitable for degrading formation or other downhole materials. For instance, the bit 110 may be a drill bit suitable for drilling the earth formation 101. Example types of drill bits used for drilling earth formations are fixed-cutter or drag bits, roller cone bits, and percussion hammer bits. In some embodiments, the bit 110 is an expandable underreamer used to expand a wellbore diameter. In other embodiments, the bit 110 is a mill used for removing metal, composite, elastomer, other downhole materials, or combinations thereof. For instance, the bit 110 may be used with a whipstock to mill into a casing 107 lining the wellbore 102. The bit 110 may also be used to mill away tools, plugs, cement, and other materials within the wellbore 102, or combinations thereof. Swarf or other cuttings formed by use of a mill may be lifted to surface, or may be allowed to fall downhole.

Figure 2:
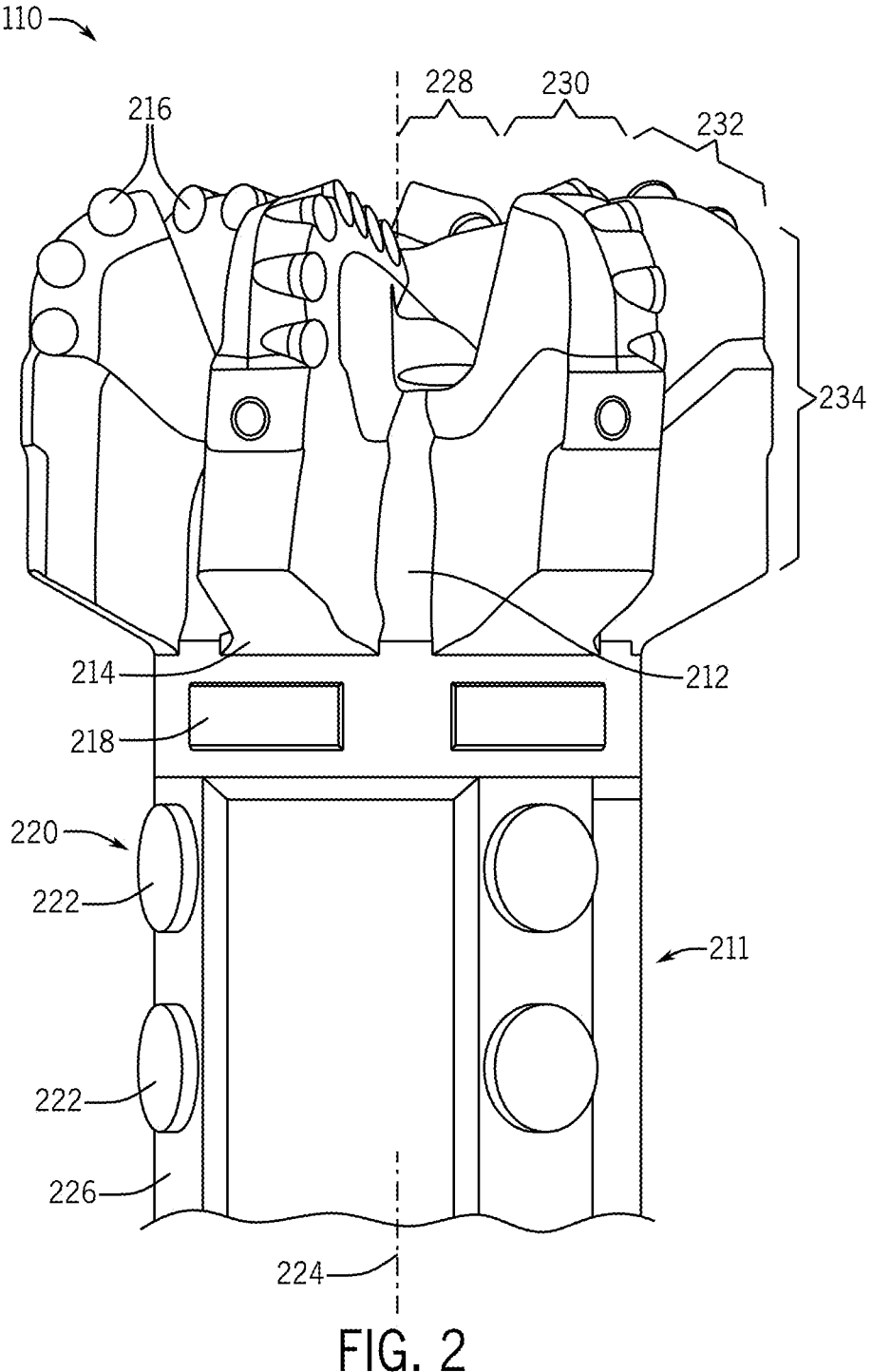
FIG. 2 is a side view of a bit coupled to a rotary steerable system, in accordance with embodiments of the present technique.

FIG. 2 is a perspective view of the downhole end of a bit 110, according to some embodiments of the present disclosure. The bit 110 in FIG. 2 is an example of a fixed-cutter or drag bit, and includes a bit body 212, and a plurality of blades 214 extending radially and azimuthally therefrom. One or more of the blades 214, and potentially each blade 214, may have a plurality of cutting elements 216 connected thereto. In some embodiments, at least one of the cutting elements 216 has a planar cutting face. A planar cutting face may be used to shear the downhole materials, and such a cutting element may be considered a shear cutting element. In other embodiments, at least one of the cutting elements 216 has a non-planar cutting face. A non-planar cutting face may shear, impact/gouge, or otherwise degrade the downhole materials. Examples of non-planar cutting elements (e.g., cutting elements having a non-planar cutting face) include cutting elements with conical, ridged, domed, saddle-shaped, chisel-shaped, or other non-planar cutting faces. In some embodiments, the bit 110 includes one or more stabilizer pads 218. A stabilizer pad 218 may be located on a blade 214 or at other locations other than a blade 214, such as on the bit body 212.

In FIG. 2, the bit 110 is coupled to a rotary steerable system ("RSS") 211 that may be used to steer the bit 110 when forming or enlarging a wellbore. The RSS 211 may include one or more steering devices 220 that are selectively actuatable to steer the bit 110. In some embodiments, the steering device 220 includes one or more pistons 222 that are actuatable to move in a radially outward direction relative to a longitudinal axis 224 of the bit 110 and RSS 211. The RSS 211 may apply a force at an angle relative to the drilling direction of the bit 110 to deflect the drilling direction. For instance, the pistons 222 may apply a force at an angle that is about perpendicular to the longitudinal axis 224, or that is within 5°, 15°, or 30° of being perpendicular to the longitudinal axis 224. In some embodiments, the steering device 220 is or includes an actuatable surface or ramp that moves in a radial direction relative to the longitudinal axis 224. The bit 110 and RSS 211 may rotate about the longitudinal axis 224, and the one or more steering devices 220 may actuate in a timed manner with the rotation to steer the bit and form a directional wellbore, or to maintain a straight wellbore.

In some embodiments, a portion of the steering device 220 (e.g., a piston 222 or housing of the piston 222) is radially within an RSS body 226 when the steering device 220 is in a retracted position. In some embodiments, at least a portion of the steering device 220 (e.g., a piston 222 and/or a housing of the piston 222) may protrude from an RSS body 226 when the steering device 220 is in an expanded or retracted position. In some embodiments, one or more portions of the RSS 211 may experience greater wear and/or impact during operation.

The cutting elements 216 of the bit 110 may experience different wear rates in different regions of the bit body 212 or blades 214. In some embodiments, the cutting elements 216 of the bit 110 experience different wear rates at a cone region 228, a nose region 230, a shoulder region 232, or a gage region 234 of the blades 214. For example, the cutting elements 216 of the nose region 230 may experience higher wear rates than the cutting elements 216 of the gage region 234. In other examples, the cutting elements 216 of the shoulder region 232 experience higher wear rates than the cutting elements 216 of the nose region 230.

In some embodiments, the bit body 212, the blades 214, the RSS body 226, or combinations thereof include one or more body materials. The bit 110 and/or the RSS 211 may be or include a second material that is harder and/or has higher wear or erosion resistance than the body material. Conventionally, the second material may be a hardfacing material that is manually applied to the bit body 212, blades 214, or RSS body 226. Hardfacing may be applied to a steel bit to increase the wear and/or erosion resistance of certain areas on the bit and/or blades. Hardfacing is conventionally a manual process that melts hardfacing rods or ropes. The melted material is applied to the bit, and the material cools on the bit to have a final geometry. The hardfacing may be applied in layers. As a manual process, hardfacing is variable and may have defects that result in premature failure of the hardfacing and/or the hardfaced components at or near the defects. For example, the hardfacing may fail at boundaries, along compositional changes, at layers, or other inconsistencies in the hardfacing material. In other examples, the hardfacing delaminates from the bit and/or blades due to insufficient bond strengths between the hardfacing material and the bit and/or blades. In some embodiments of a cutting tool according to the present disclosure, one or more portions of a bit 110 and/or RSS 211 include gage protection or other inserts positioned in the bit and/or blades and affixed to the bit and/or blade. The inserts may have a higher wear and/or erosion resistance than adjacent bit material to prolong the operational lifetime of a tool that may not include hardfacing.

Figure 3A:
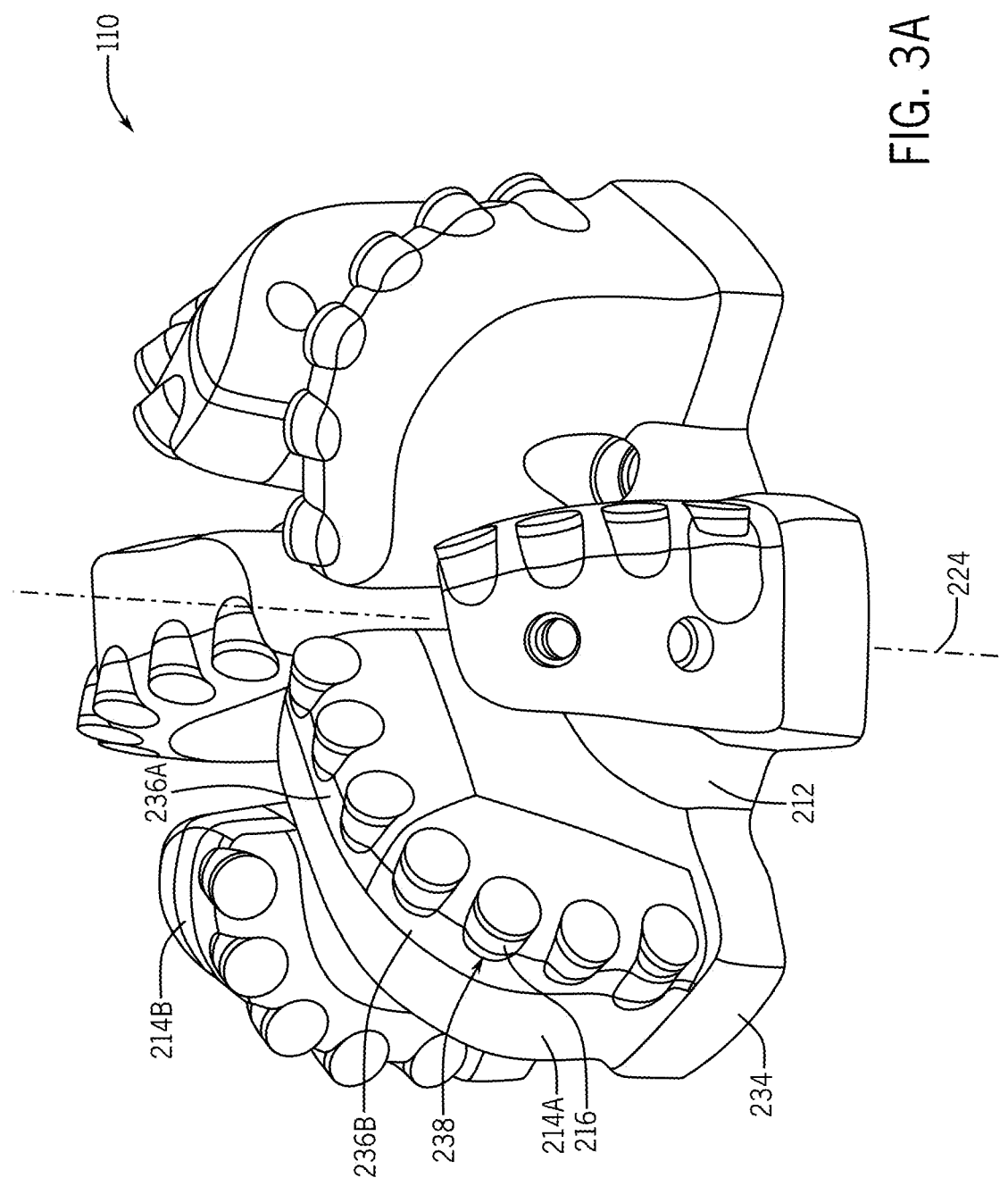
FIG. 3A is a perspective top view of a portion of a bit having blades that include pre-fabricated blade segments that are metallurgically bonded to the bit body, in accordance with embodiments of the present technique.

FIG. 3A is a perspective view of a crown of an embodiment of the bit 110 with a bit body 212 that includes a plurality of blades. In some embodiments, the bit body 212 includes one or more primary blades 214A and one or more secondary blades 214B. In some embodiments, the primary blades 214A and secondary blades 214B both extend to the gage region 234 of the bit 110, and the primary blades 214 extend radially inward to be nearer the longitudinal axis 224 of the bit 110 when compared to the secondary blades 214. In some embodiments, tertiary blades are also included, which extend to the gage region, but are farther from the longitudinal axis 224 than are the secondary blades 214B.

Figure 3B:
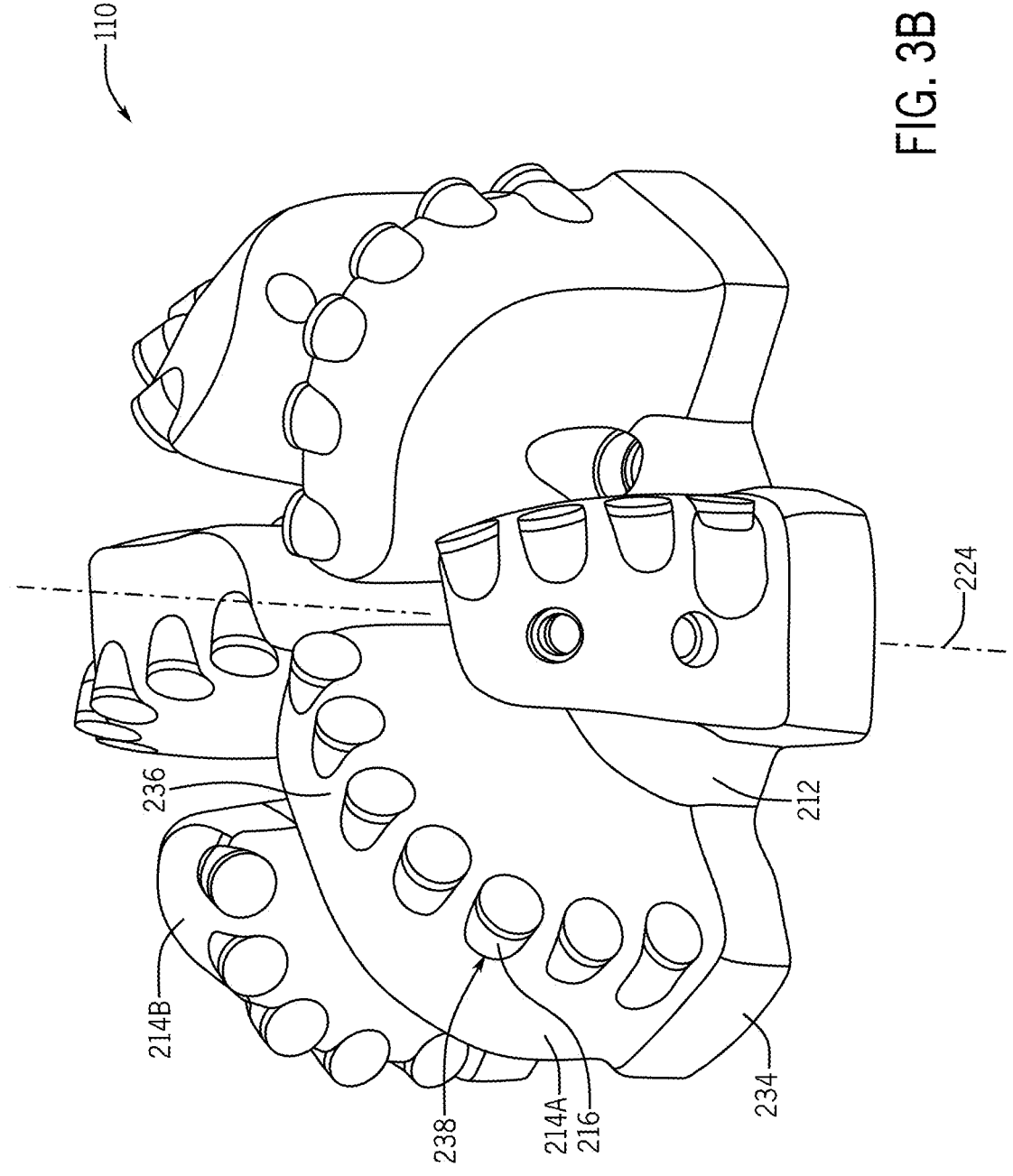
FIG. 3B is a perspective top view of a portion of a bit that includes a pre-fabricated shell that is metallurgically bonded to the bit body, in accordance with embodiments of the present technique.

In some embodiments, a bit 110 includes at least one primary blade 214A, secondary blade 214B, or tertiary blade (collectively, blades 214), that includes one or more pre-fabricated blade segments 236A, 236B as shown in FIG. 3A, or a pre-fabricated shell 236 as shown in FIG. 3B (collectively pre-fabricated components 236) metallurgically bonded thereto. The one or more pre-fabricated components 236 are irreversibly or irremovably bonded to the bit body 212, as discussed below, and include one or more cutter pockets 238 therein. The one or more pre-fabricated components 236 may define cutter pockets 238 that include a sidewall and optionally a base. In some embodiments, a cutting element 216 is positioned in the cutter pocket 238. While shear cutting elements 216 are shown in FIG. 3A, the cutting element 216 may be any suitable cutting element (e.g., a non-planar cutting element) in accordance with the present disclosure. As discussed below, the one or more pre-fabricated components 236 (e.g., shell, blade segment) are superficially metallurgically bonded to the bit body 212 as the bit body is formed via a casting or infiltration process. In some embodiments, a first blade segment 236A forms at least a portion of a blade 214 (e.g., primary blade 214A). In the same or other embodiments, a second segment 236B forms a portion of the same blade 214 that has the first segment 236A coupled thereto.

In some embodiments, the one or more pre-fabricated components 236 include or are made of an additively manufactured material, such as sintered, infiltrated, and/or cemented particles of an ultrahard material. In certain embodiments, the material of the one or more pre-fabricated components may be the same or different from a bit body material or a material used to form the remainder of the bit and/or the blades. For example, the material of the one or more pre-fabricated components may include a ceramic, carbide, diamond, or ultrahard material that is different than a ceramic, carbide, metal, metal alloy, or other material of the bit body 212 or blade 214. An "ultrahard material" is understood to refer to those materials known in the art to have a grain hardness of 1,500 HV (Vickers hardness in kg/mm$^2$) or greater. Such ultra-hard materials can include those capable of demonstrating physical stability at temperatures above 750° C., and for certain applications above 1,000° C., that are formed from consolidated materials. In some embodiments, the ultrahard material has a hardness values above 3,000 HV. In other embodiments, the ultrahard material has a hardness value above 4,000 HV. In yet other embodiments, the ultrahard material has a hardness value greater than 80 HRa (Rockwell hardness A). In some examples, the material of the one or more pre-fabricated components includes a carbide material (e.g., tungsten carbide, tantalum carbide, titanium carbide, etc.). According to some embodiments, a carbide material forming the pre-fabricated component(s) 236 is an infiltrated, sintered, or cemented carbide material. In some embodiments, the carbide material is sintered and cemented (e.g., a sintered tungsten carbide including a binder and formed by additive manufacturing). In yet other examples, the material of the one or more pre-fabricated components includes ultrahard matrix particles (e.g., tungsten carbide, titanium carbide) embedded in a suitable binder metal (e.g., a copper or nickel alloy). In some embodiments, the bit body may be a steel alloy and may not include an ultrahard material, and only the one or more pre-fabricated components 236 and the cutting elements 216 of the bit may include ultrahard materials.

In some embodiments, the bit body material and/or blade material is a material with a lower erosion and/or wear resistance than the component material of the one or more pre-fabricated components (e.g., shell, blade segments). In other embodiments, the bit body material and/or blade material is a material with higher toughness than the material of the one or more pre-fabricated components. In some examples, the bit body material and/or blade material includes a steel alloy and the material of the one or more pre-fabricated components includes a tungsten carbide. The steel alloy may have a higher toughness than the tungsten carbide, which is more brittle, and the tungsten carbide may provide greater wear and/or erosion resistance during cutting operations.

Figure 3C:
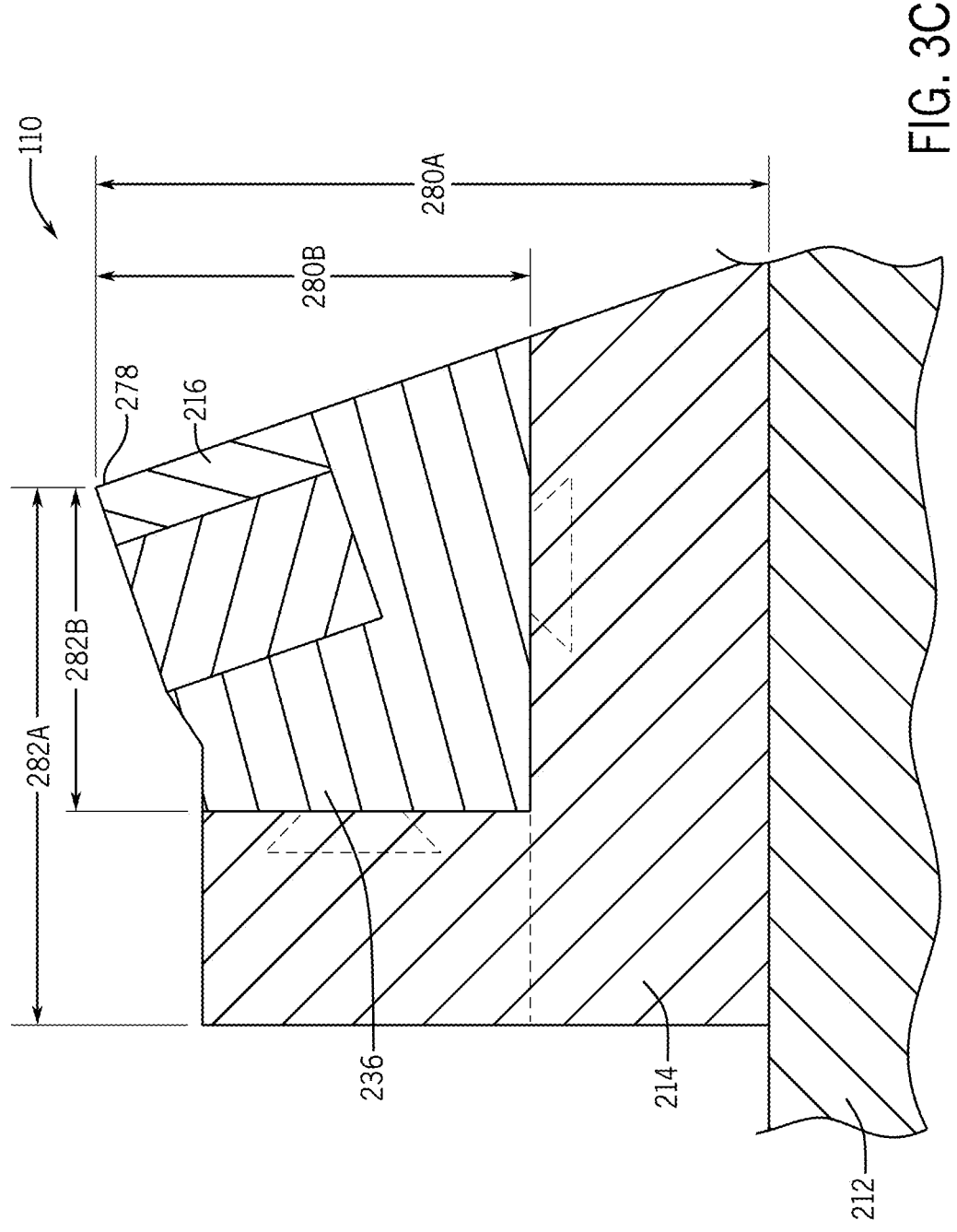
FIG. 3C is a side cross-sectional schematic representation of a blade of the bit of FIG. 3A, in accordance with embodiments of the present technique.

As mentioned, the pre-fabricated components may include blade segments 236 that may form the full length of the bit blades 214, a partial length of the bit blades, and/or particular surfaces of the bit blades, such as the fronts of the bit blades, the tops of the bit blades, the rears of the bit blades, or combinations thereof. For example, FIG. 3C is a side cross-sectional view of a blade 214 of an embodiment of the bit 110, according to the present disclosure. In some embodiments, a pre-fabricated blade segment 236 forms at least a portion of a blade 214 that extends from a bit body 212. A cutting element 216 may be positioned in and connected to the blade segment 236, for example, via brazing. In some embodiments, a size of the blade segment 236 is defined by a vertical ratio and a horizontal ratio relative to a cutting tip 278 of the cutting element 216. The cutting tip 278 may be the outermost point of the cutting element 216 from the bit body 212, such that the cutting tip 278 is the first point of the cutting element 216 to contact the material being removed during cutting operations.

In some embodiments, the blade 214 has a blade height 280A and the blade segment 236 has a segment height 280B. The blade height 280A is measured from the bit body 212 to the cutting tip 278. The segment height 280B is measured from the point of the blade segment 236 closest to the bit body 212 to the cutting tip 278. The vertical ratio is the ratio of the segment height 280B to blade height 280A. For example, a segment height 280B that is one half of the blade height 280A has a vertical ratio of 0.5. In some embodiments, the vertical ratio is in a range having an upper value, a lower value, or upper and lower values including any of 0.1, 0.25, 0.5, 0.75, 0.95, 1.0, or any values therebetween. For example, the vertical ratio may be greater than 0.1. In other examples, the vertical ratio is between 0.2 and 0.95. In yet other examples, the vertical ratio is between 0.3 and 0.95. In further examples, the vertical ratio is between 0.34 and 0.9. In at least one example, the vertical ratio is greater than 0.34. In still other embodiments, the vertical ratio is less than 0.1 or even greater than 1.0 (e.g., where the blade segment is inset into the bit body and extends the full blade height 280A).

In some embodiments, the blade 214 has a blade width 282A and the blade segment 236 has a segment width 282B. The blade width 282A is measured from the rearmost point of the blade 214 to the cutting tip 278. The segment width 282B is measured from the rearmost point of the blade segment 236 to the cutting tip 278. The horizontal ratio is the ratio of the segment width 282B to blade width 282A. For example, a segment width 282B that is one half of the blade width 282A has a horizontal ratio of 0.5. In some embodiments, the horizontal ratio is in a range having an upper value, a lower value, or upper and lower values including any of 0.1, 0.25, 0.5, 0.75, 0.95, 1.0, or any values therebetween. For example, the horizontal ratio may be greater than 0.1. In other examples, the horizontal ratio is between 0.2 and 0.95. In yet other examples, the horizontal ratio is between 0.3 and 0.95. In further examples, the horizontal ratio is between 0.37 and 0.9. In at least one example, the horizontal ratio is greater than 0.37. In still other embodiments, the horizontal ratio is less than 0.1 or greater than 1.0 (e.g., where the segment over hangs the blade 214). In FIG. 3C, the dashed lines on the base of the blade illustrate an example segment 236 having a horizontal ratio equal to 1.0.

Figure 3D:
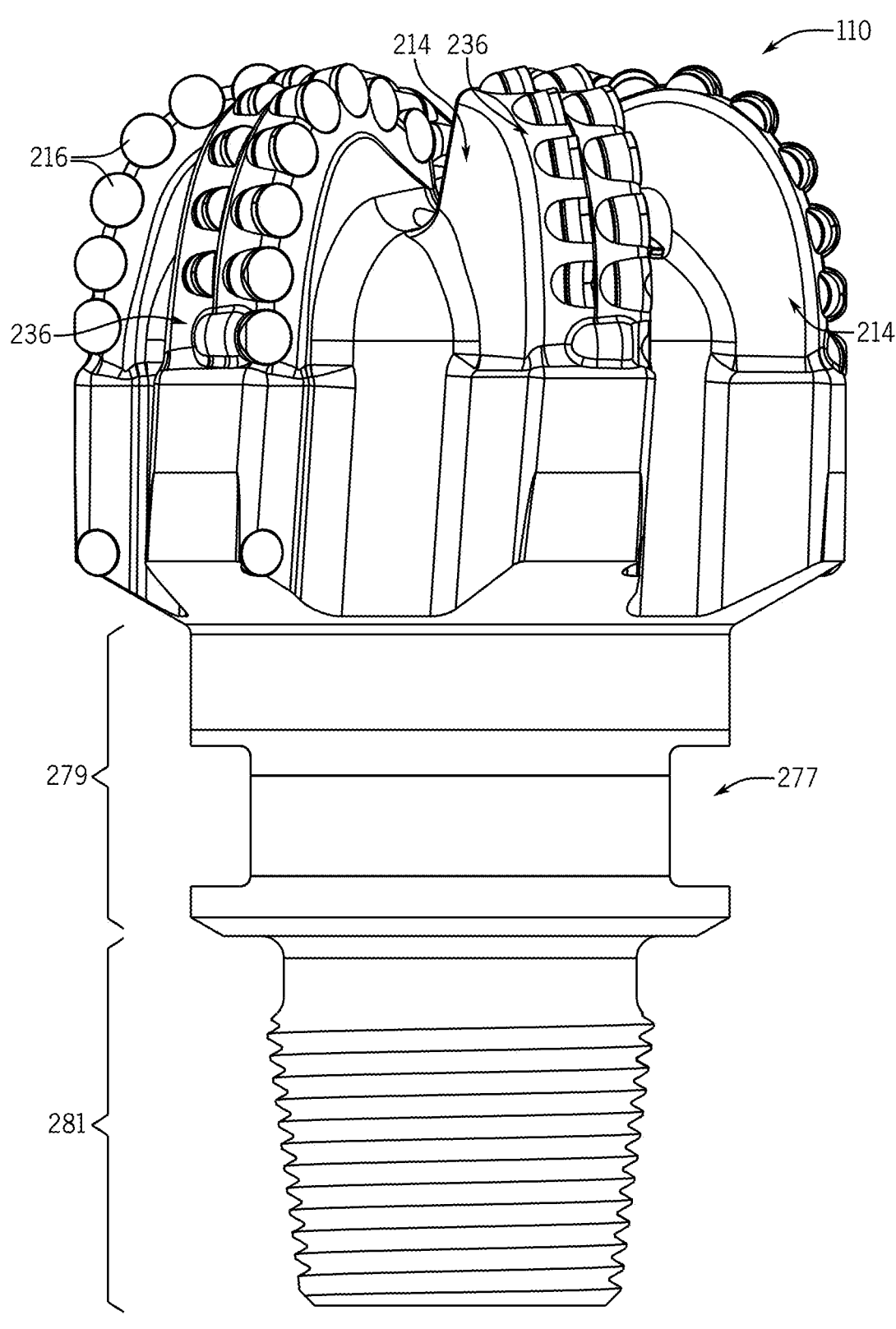
FIG. 3D is a perspective side view of the bit of FIG. 3A, in accordance with embodiments of the present technique.

FIG. 3D is a perspective side view of the embodiment of the bit 110 of FIG. 3A. The illustrated bit 110 includes the blades 214, the one or more pre-fabricated components 236 (e.g., shell, blade segments), and the cutting elements 216, as discussed above. Additionally, the illustrated embodiment of the bit 110 includes a base portion 279 and a threaded portion 281. In certain embodiments, the base portion 279 and the threaded portion 281 of the bit 110 may be formed from a suitable steel alloy. For example, in certain embodiments, the bit body 212 may be made of an MMC material, and the base 279 and/or the threaded portion 281 may be formed from a steel blank that is inserted into the mold before the casting or infiltration process is performed, as discussed below. In certain embodiments, the threaded portion 281 may be pre-fabricated from steel and welded to the base 279, while in other embodiments, the threaded portion 281 may be machined from a portion of the base 279 after the bit body 212 is formed. In other embodiments, the bit body 212, the base 279, and the threaded portion 281 are all formed from a steel blank and/or steel alloy powder using a casting process, wherein the base 279 and/or the threaded portion 281 may be machined into the illustrated shapes or other suitable shapes. Additionally, for the embodiment illustrated in FIG. 3B, the base portion 279 includes a breaker slot 277.

Figure 4:
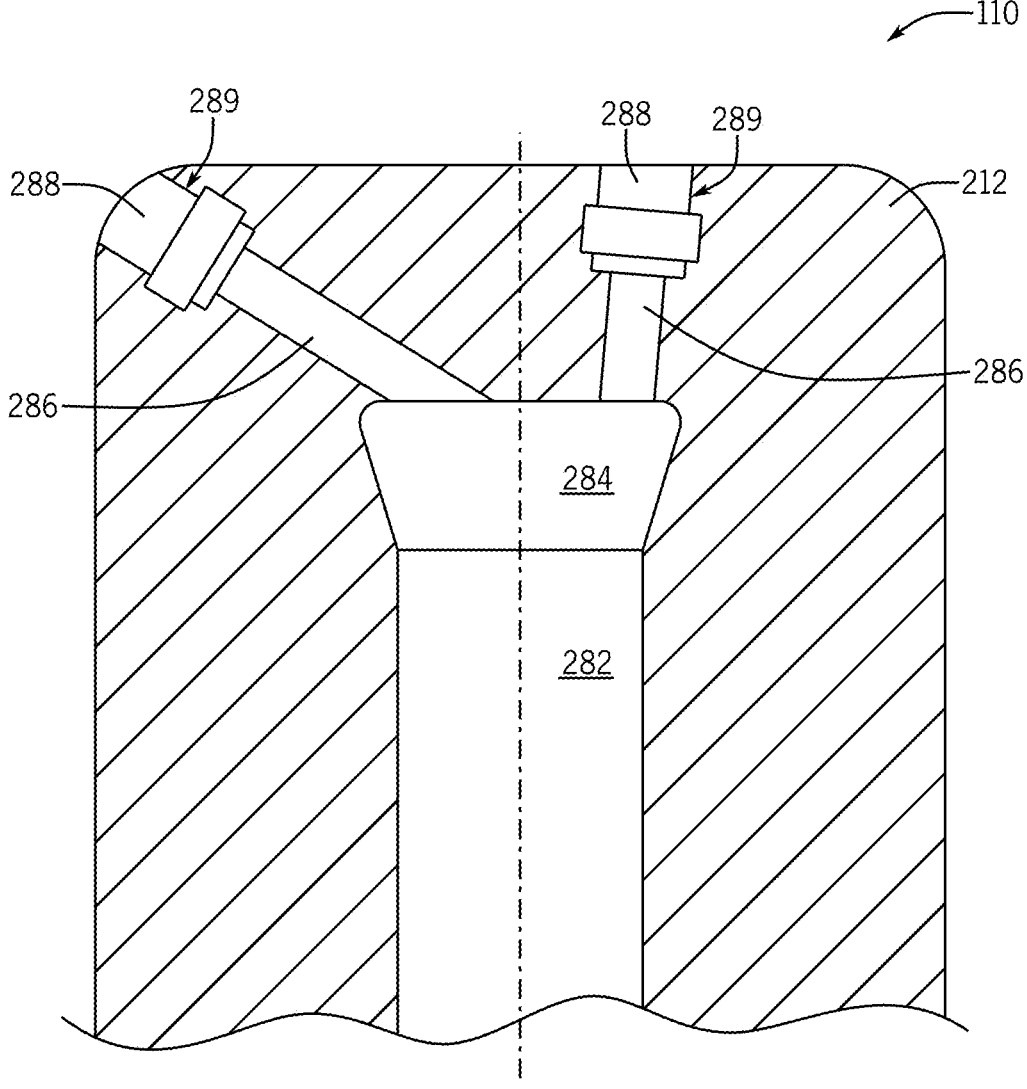
FIG. 4 is a side cross-sectional schematic representation of a bit body having fluid passages, in accordance with embodiments of the present technique.

FIG. 4 is a side partial cross-sectional schematic representation of a bit body 212 that illustrates the internal fluid passages for an embodiment of the bit 110. The illustrated bit 110 includes a central conduit 282 into which a drilling fluid may be conveyed, as described in relation to FIG. 1. The drilling fluid may be water, drilling mud, or another fluid that provides lubrication and cooling to the bit 110. A central conduit 282 may extend to the threaded portion 281 of the bit 110, as illustrated in FIG. 3D, and direct drilling fluid to a chamber 284. In some embodiments, the chamber 284 may be a crowfoot chamber, as illustrated. In other embodiments, the chamber 284 may have other shapes or configurations to distribute fluid pressure throughout the chamber 284 and to a plurality of flow passages extending from the chamber 284. For example, one or more flow passages 286 may extend from the chamber 284 or central conduit 282 and provide fluid communication from the respective chamber 284 or central conduit 282 to one or more nozzles 288 typically disposed in a junk slot surface of the bit. In certain embodiments, the bit body 212 includes threaded (e.g., pre-fabricated, machined, or cast) outlets 289 into which the nozzles 288 are threaded and secured. As noted below, in certain embodiments, the threaded outlets 289 and/or the nozzles 288 may be formed in the pre-fabricated shell. Together, the flow passages 286 and nozzles 288 serve to distribute drilling fluid around the cutter elements 216 for flushing drilled formation (e.g., cuttings) from the bottom of the borehole and away from the cutting faces of cutter elements 216 during drilling. Amongst several other functions, the drilling fluid also serves to cool the cutter elements 216 during drilling.

FIG. 5 is a flow diagram illustrating an embodiment of a process 360 for manufacturing an embodiment of the bit 110 using metallurgically bonded, pre-fabricated components that are blade segments. It may be appreciated that the illustrated process 360 is merely provided as an example, and in other embodiments, the process 360 may include additional steps, repeated steps, omitted steps, and so forth, in accordance with the present disclosure. In certain embodiments, the actions of the process 360 may be manually performed by a human manufacturer, while in other embodiments, at least a portion of the actions of the process 360 may be carried out by one or more processors of a suitable automated manufacturing system. Additionally, the process 360 of FIG. 5 is discussed with reference to elements illustrated in FIGS. 6-8.

Figure 6:
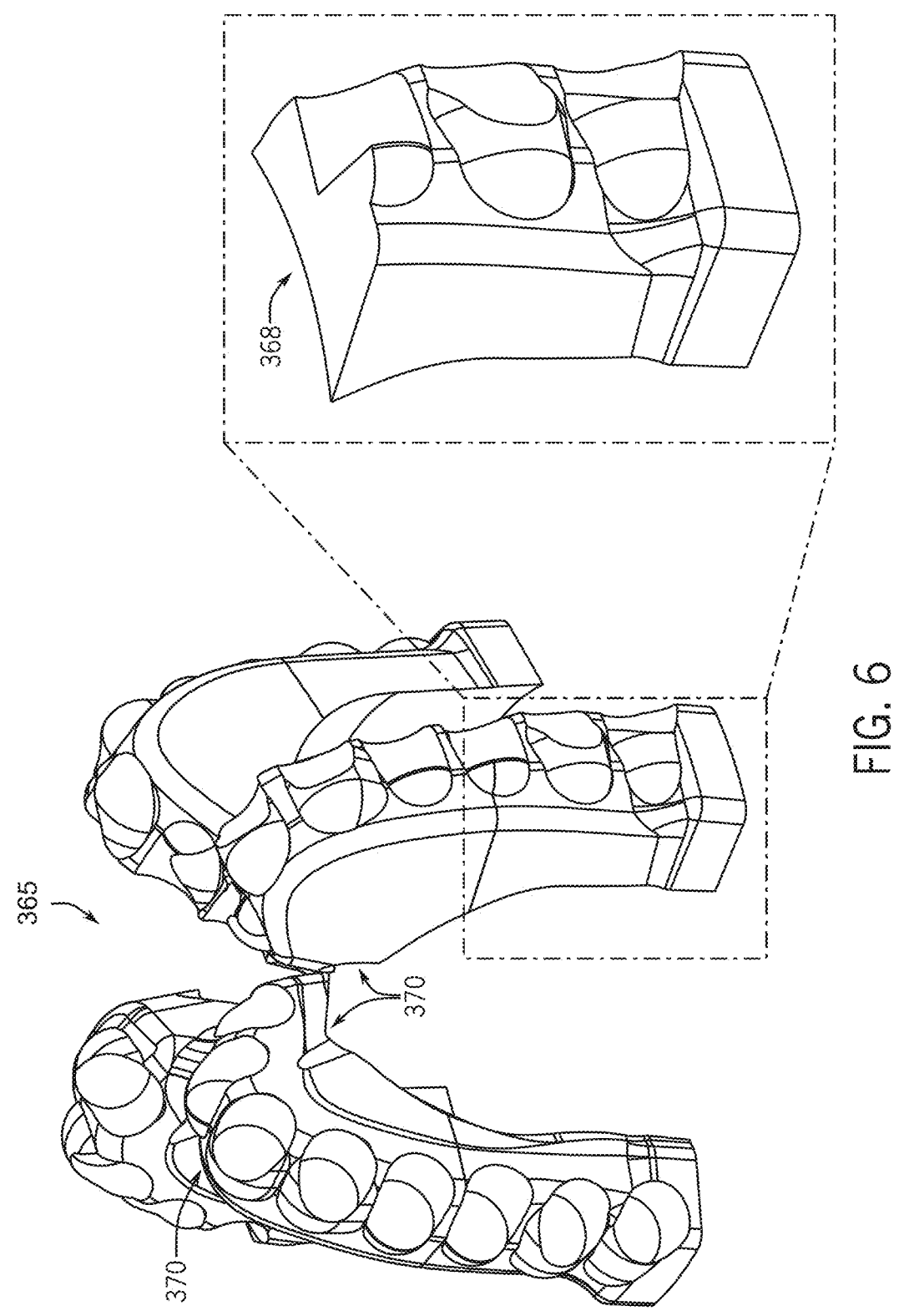
FIG. 6 is a perspective view of an embodiment of a blade assembly of a bit that includes a number of pre-fabricated blade segments, in accordance with embodiments of the present technique.

For the embodiment illustrated in FIG. 5, the process 360 begins with fabricating a number of pre-fabricated components (e.g., blade segments 368) (block 362). For example, FIG. 6 is a perspective view of an embodiment of a blade segment assembly 365 of a bit 110, wherein the assembly 365 includes a number of pre-fabricated or pre-manufactured blade segments 368. As mentioned, the blade segments 368 are made of a suitable component material. For example, in certain embodiments, the component material may include titanium carbide (TiC), tungsten carbide (WC), cast tungsten carbide (WC/W$_2$C), or any other suitable refractory material. In certain embodiments, the component material may be a MMC having a metallic binder, such as nickel-silicon-boron (Ni—Si—B) and copper-zinc-silver (Cu—Zn—Ag). Thus, in certain embodiments, a MMC blade segment could include a tungsten carbide-nickel (WC+nickel) MMC, a tungsten carbide-copper (WC+copper) MMC, or another suitable MMC having at least one ultrahard material. The illustrated blade segments 368 may be fabricated using any suitable manufacturing process that yields high-density (e.g., 90%+) parts that include at least one ultrahard material.

For example, in certain embodiments, the blade segments 368 can be pre-fabricated using an additive manufacturing process, a separate infiltration process (e.g., a mold infiltration process or a green body infiltration process), a hot press process, hot isostatic pressure (HIP) process, or a suitable combination thereof, capable of producing high-density parts from ultrahard materials. For example, in certain embodiments, the blade segments 368 may be produced using directed energy deposition, in which focused thermal energy in the form of a laser, electron beam (e-beam), or plasma arc is used to melt or soften a suitable material that is subsequently deposited to iteratively form layers of the part. In certain embodiments, the blade segments 368 may be produced using a binder jetting manufacturing process, in which a liquid binder is iteratively deposited onto layers of a suitable material powder to form a low-density green body part, and then the green body part is subsequently sintered or infiltrated/cemented with a suitable binder metal during a heat treatment to form a high-density, additively manufactured part. Additionally or alternatively, in certain embodiments, a HIP process may be applied to a lower density part to eliminate micropores and enhance the sintering quality. In certain embodiments, the blade segments 368 may be formed using a powder bed fusion process, also referred to as direct metal laser sintering (DMLS), direct metal laser melting (DMLM), or selective laser melting (SLM), in which focused thermal energy in the form of a laser or electron beam is used to selectively heat and sinter portions of a bed of ultrahard material powder to iteratively form layers of the additively manufactured part.

Regardless of the manufacturing technique used, it is desirable for the pre-fabricated blade segments 368 to be high-density parts having sintered, infiltrated, and/or cemented ultrahard material particles. For example, in certain embodiments, the pre-fabricated blade segments 368 may have a density greater than about 90%, such as between 90% and 100%, or about 95%. As such, for the embodiments disclosed herein, when a binder jet additive manufacturing process is used, then the blade segments 368 are used after sintering, HIP processing, or an infiltration process (e.g., in air or under vacuum), as opposed to using the low-density green body blade segments that are initially formed. It is presently recognized that, during the later casting or infiltration step to form the bit body, the high-density blade segments 368 are only superficially penetrated by the molten binder and/or filler metal, as discussed below, to secure the segments within the bit 110. It is further presently recognized that the metallurgical bond can also be enhanced by adding surface abnormalities to increase contact area and/or applying mechanical constraints.

More specifically, the blade segment assembly 365 of FIG. 6 includes a number of pre-fabricated blade segments 368 that are configured to be positioned relative to one another as the segments will be loaded into a mold, as discussed below. As such, it may be noted that the illustrated pre-fabricated blade segments 368 may not be separately attached or coupled to one another with fasteners, as the pre-fabricated blade segments 368 will be secured by the filler and/or binder metal during the later casting or infiltration step. In other words, FIG. 6 illustrates how the individual pre-fabricated blade segments 368 may be arranged to form the complete blade assembly within a mold for a particular embodiment. In certain embodiments, the blade assembly 365 may include any suitable number of pre-fabricated blade segments 368 that form suitable portions of the blades 214 of the bit 110, as discussed above. It may be appreciated that, because the pre-fabricated blade segments 368 have complex geometries, forming the blade assembly 365 from a greater number of smaller pre-fabricated blade segments 368 may enable reduced fabrication costs and increased yield, as opposed to fabricating a blade assembly 365 having a few number of larger pre-fabricated blade segments 368. Additionally, while having a greater number of smaller pre-fabricated blade segments 368 increases the number of segments that are loaded into the mold, it is presently recognized having a greater number of smaller pre-fabricated blade segments 368 advantageously enhances the freedom of movement of the segments as they are loaded into the blade segment receptacles, as discussed below. In certain embodiments, each of the individual pre-fabricated blade segments 368 may be fabricated during a distinct additive manufacturing process run. In some embodiments, the pre-fabricated blade segments 368 of one or more blade assemblies 365 may be fabricated during the same additive manufacturing process run.

Additionally, in certain embodiments, an inner surface 370 of each of the pre-fabricated blade segments 368 may be different from the remainder of the part to enhance bonding between the pre-fabricated blade segments 368 and the molten filler and/or binder metal during the casting or infiltration step discussed below. For example, in certain embodiments, the inner surface 370 of the pre-fabricated blade segments 368 may be modified (e.g., roughened, textured) using a tumbling operation, a peening operation (e.g., laser shock peening and shot peening), or another suitable process to increase a surface area of the inner surface 370 and/or provide a desired surface finish to enhance bonding during the later casting or infiltration process. In certain embodiments, the inner surface 370 of the pre-fabricated blade segments 368 may be additively manufactured having a surface morphology or surface geometry that enhances interactions and bonding to the filler and/or binder metal during the later casting and infiltration process. For example, in certain embodiments, the inner surface 370 may include micron-scale to millimeter-scale dimples, ridges, troughs, grooves, corrugations, undulations, or other suitable surface features that increase the surface area of the inner surface 370 to enhance surface interactions and bonding. In certain embodiments, the inner surface 370 of the pre-fabricated blade segments 368 may be formed from one or more layers of a material that is different from the ultrahard material that forms the remainder of the pre-fabricated blade segments 368. In other embodiments, a mixture of filler/binder material could be brushed onto the inner surface 370 of the segments 368 for enhanced bonding. For example, in certain embodiments, the inner surface 370 of the pre-fabricated blade segments 368 may include one or more bonding layers made of a steel or copper alloy that is desirably penetrated by the filler and/or binder metals during the later casting or infiltration process.

Figure 7A:
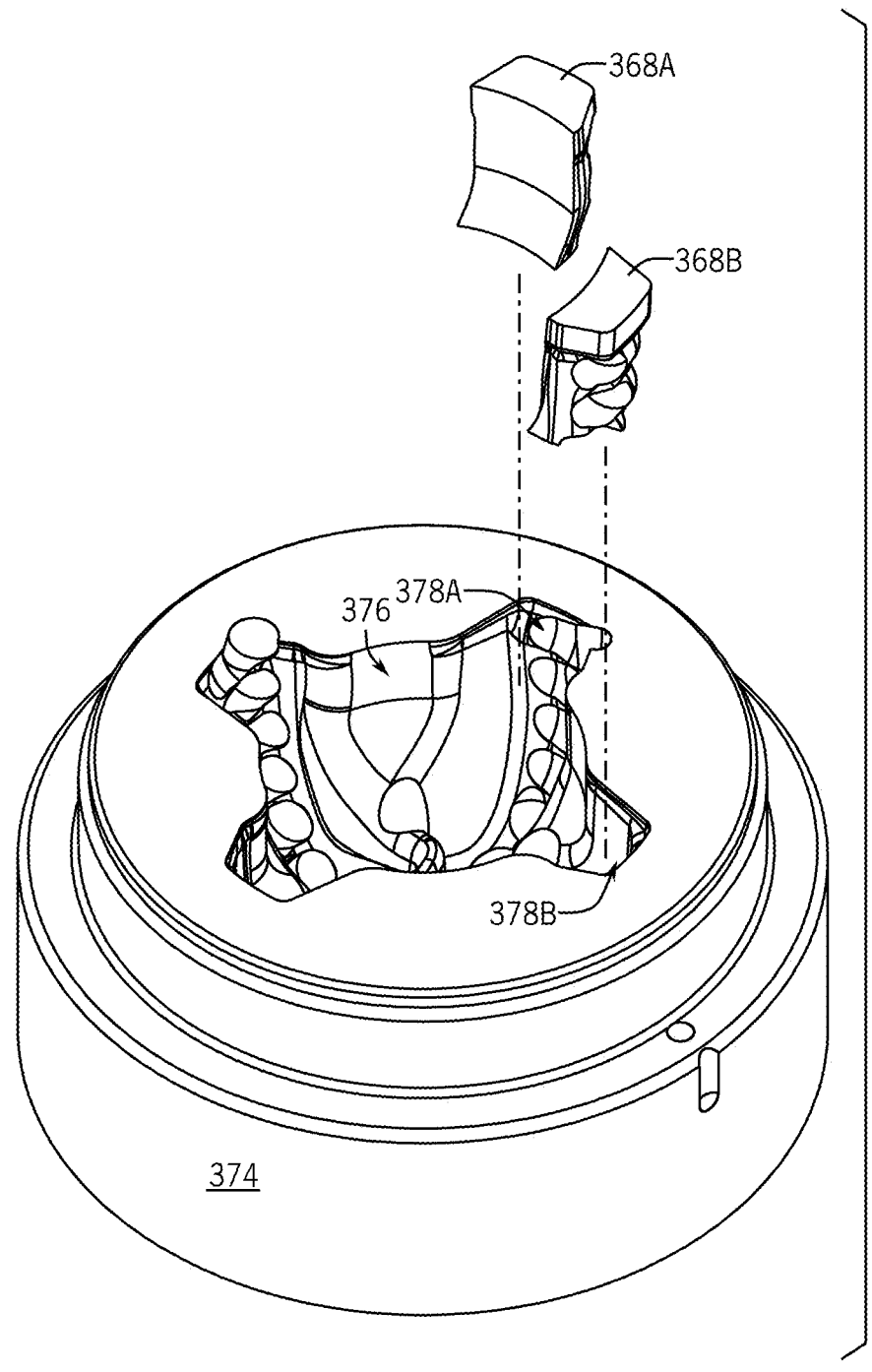
FIGS. 7A and 7B are perspective views of a mold having a mold cavity with a number of blade segment receptacles being loaded therein during the manufacturing process of FIG. 5, in accordance with embodiments of the present technique.
Figure 7B:
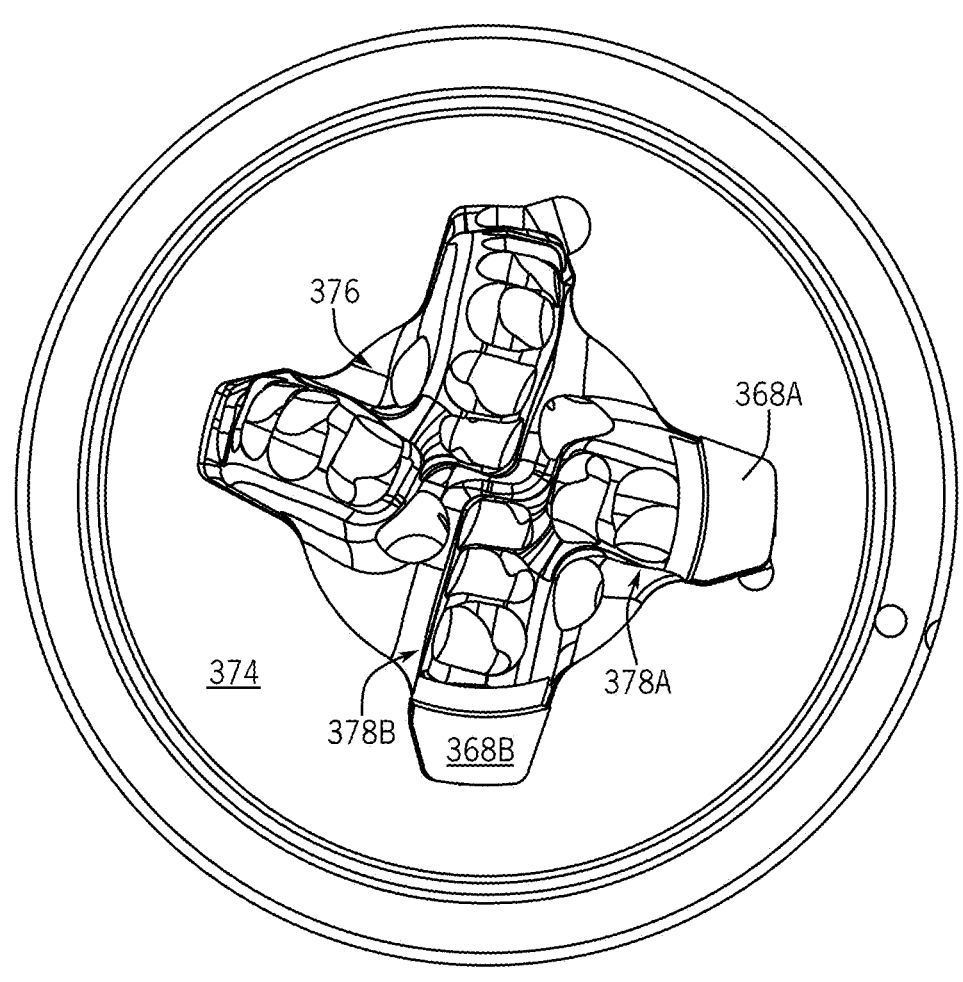

Returning to the embodiment of FIG. 5, the process 360 continues with the fabrication of a mold (block 372). For example, FIGS. 7A and 7B illustrate an embodiment of a mold 374 having a mold cavity 376 with a number of blade segment receptacles 378 being loaded therein. In certain embodiments, the mold 374 may be made of graphite or a suitable refractory material. For example, in certain embodiments, the mold 374 may be manufactured by machining a block of graphite to include the blade segment receptacles 378 that are suitably shaped to receive the pre-fabricated blade segments 368. In certain embodiments, the mold 374 may be fabricated by a computer numerical control (CNC) system based on a computer-aided design (CAD) model of the mold 374, wherein the CNC system includes suitable machining tools (e.g., drills, boring tools, rotary tools, lathes, and so forth) to precisely shape the mold 374 and form the blade segment receptacles 378 therein. In the illustrated embodiment, the blade segment receptacles 378 of the mold 374 may be described as having a complex, three-dimensional geometry that is complimentary to the complex, three-dimensional geometry of the pre-fabricated blade segments 368 to enable a secure fit. In some embodiments, the blade segment receptacles 378 may be configured to interface with portions of the pre-fabricated blade segments 368 without interfacing with other portions (e.g., cutter pockets 238) of the pre-fabricated blade segments. That is, the blade segment receptacles 378 may be configured to receive any of multiple pre-fabricated blade segments with various cutter pocket placements and orientations, thereby reducing machining time of the present molds 374. In other words, it is presently recognized that an additional benefit of the disclosed technique is that, because certain surface features of the blades 214 of the bit 110 are formed from the pre-fabricated blade segments 368, rather than being formed by casting or infiltrating a mold in a traditional manner, the disclosed mold 374 may include substantially fewer or simpler features than would be present in a traditional mold. As noted herein, the mold 374 is sacrificial, meaning that the mold 374 is broken to retrieve the manufactured bit after the casting or infiltration process, as discussed below. As such, it may be appreciated that reducing the cost and complexity of the mold 374 may represent a substantial reduction in cost and improvement in efficiency, in certain embodiments.

The embodiment of the process 360 illustrated in FIG. 5 continues with loading the pre-fabricated blade segments 368 into the mold 374 (block 380). For example, returning to FIGS. 7A and 7B, in addition to the mold 374, two pre-fabricated blade segments 368A and 368B are illustrated. In FIG. 7A, the pre-fabricated blade segments 368A and 368B are positioned above their respective blade segment receptacles 378A and 378B, while in FIG. 7B, the segments 368A and 368B are loaded into their respective receptacles 378A and 378B within the mold cavity 376. In various embodiments, there may be any suitable number of pre-fabricated blade segments 368 that are arranged axially, helically, or in another suitable arrangement to produce the desired drill bit configuration. Additionally, each of the receptacles 378 of the mold 374 may receive any suitable number of pre-fabricated blade segments 368. For example, in certain embodiments, at least one of the receptacles 378 of the mold 374 may receive a single pre-fabricated blade segment 368 that spans the entire receptacle, while another one of the receptacles 378 may receive multiple (e.g., 2, 3, or more) pre-fabricated blade segments 368 that are aligned end-to-end to span the receptacle. For the illustrated embodiment, each of the pre-fabricated blade segments 368 may be described as having a complex, three-dimensional structure or geometry that corresponds to and compliments the complex, three-dimensional structure of each receptacle 378, such that there is a secure fit upon loading. That is, as mentioned above, in certain embodiments, the mold 374 may not have the exact complex, three-dimensional structure of the pre-fabricated blade segments 368. In an example, for a mold 374 that is designed to be used with various blade segment designs having different features, such as the arrangement or orientations of the cutter pockets 238, the shape or geometry of each receptacle 378 may generally (e.g., not exactly or perfectly) correspond to the complex, three-dimensional geometry of the pre-fabricated blade segments 368. Additionally, while only two blade segments 368 are illustrated as being loaded in FIGS. 7A and 7B, it may be appreciated that the remaining pre-fabricated blade segments 368 are loaded into their corresponding receptacles 378 in the mold cavity 376 before the process 360 proceeds.

Figure 8A:
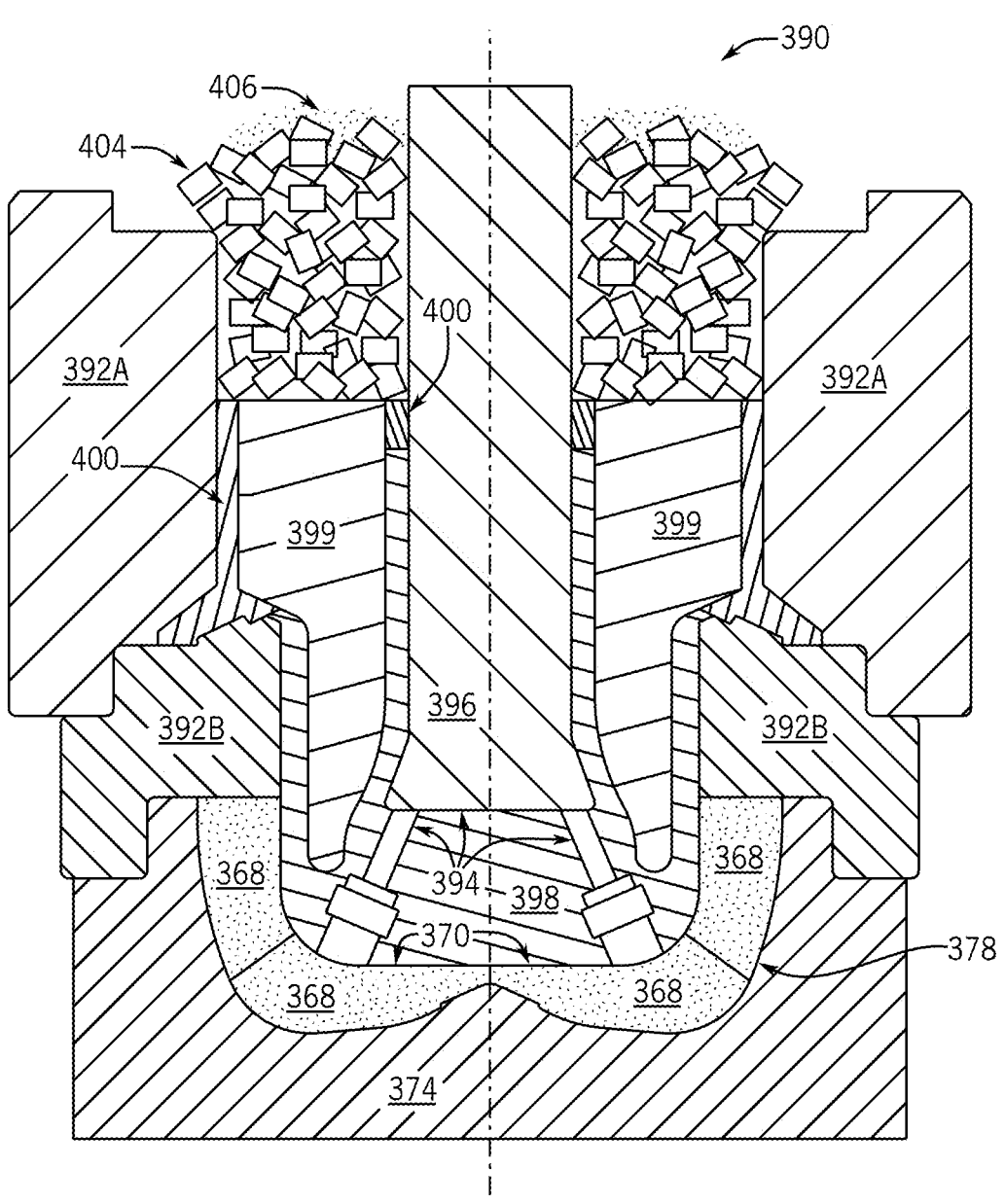
FIG. 8A is a cross-sectional view of an embodiment of a mold assembly for manufacturing an embodiment of the drill bit using an infiltration process and a steel blank, in accordance with embodiments of the present technique.
Figure 8B:
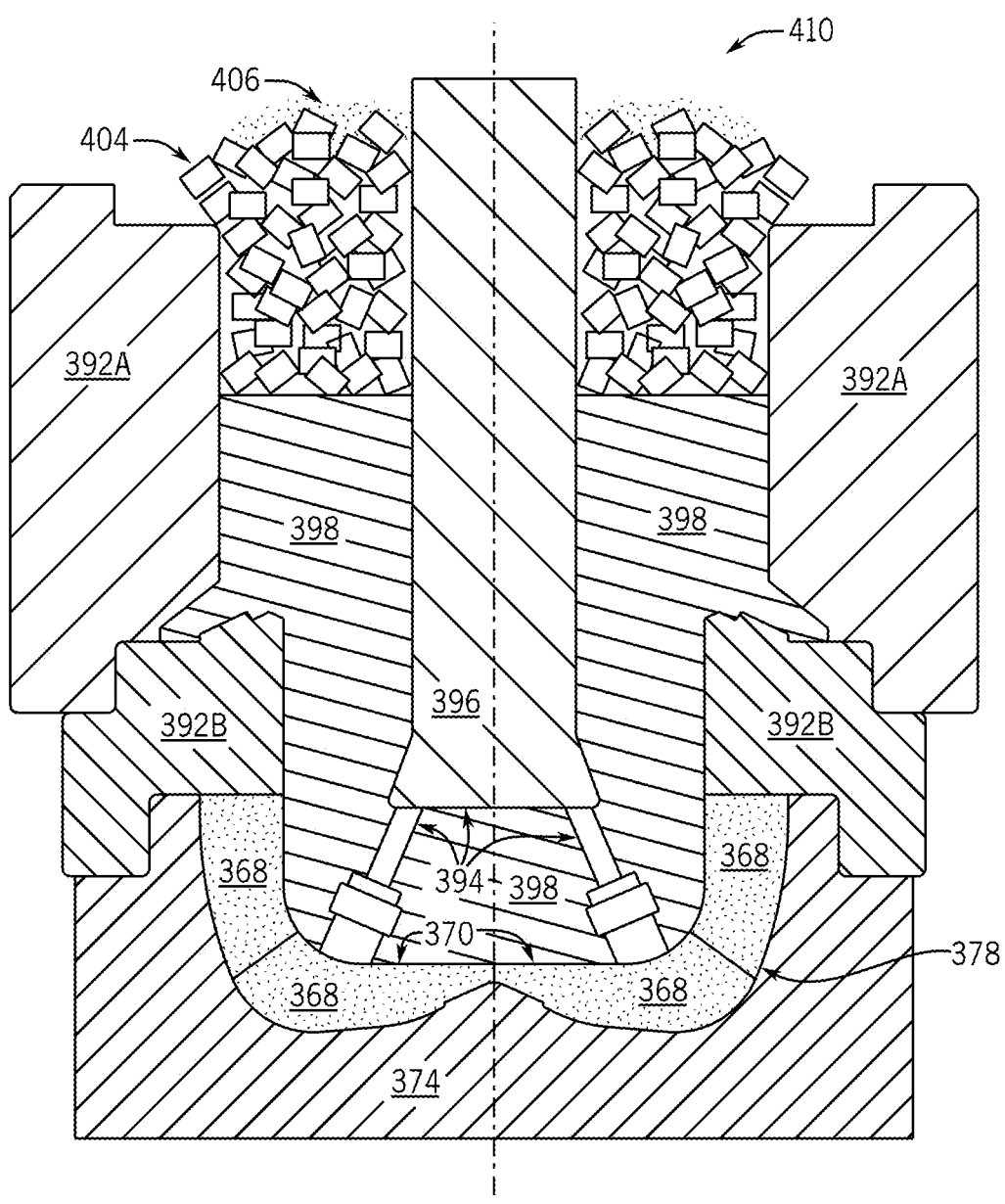
FIG. 8B is a cross-sectional view of another embodiment of a mold assembly for manufacturing an embodiment of the drill bit using an infiltration process without a steel blank, in accordance with embodiments of the present technique.

Continuing through the embodiment of the process 360 illustrated in FIG. 5, once the pre-fabricated blade segments 368 have been loaded into the blade segment receptacles of the mold 374, a mold assembly is formed in and around the mold 374 in preparation for the casting or infiltration process (block 382). For example, FIGS. 8A and 8B are cross-sectional views of a mold assembly 390 for embodiments that involve an infiltration process. The mold assembly 390 includes the mold 374 having the pre-fabricated blade segments 368 loaded within corresponding blade segment receptacles 378 of the mold 374. The mold assembly 390 further includes one or more funnel rings 392A, 392B that are secured around and above the mold 374 to surround and contain the contents of the mold assembly 390. Constructing the mold assembly 390 also includes disposing one or more displacements 394 (e.g., resin-bonded sand or graphite displacements) within the mold cavity 376 to define the internal fluid passages of the bit 110. In certain embodiments, the displacements 394 include a crowfoot-shaped displacement 396 that defines the central conduit 282, including the crowfoot chamber 284, the flow passages 286, and the nozzles or outlets 288 of the bit 110, as illustrated in FIG. 4 above. It may be appreciated that the displacement material is designed to maintain its shape and is not infiltrated during the later casting or infiltration process, ensuring that the internal fluid passages of the bit 110 remain open and unobstructed.

Additionally, constructing the mold assembly 390 illustrated in FIGS. 8A and 8B also includes disposing one or more powdered materials into the mold 374. The one or more powdered materials 398 are added to occupy the volume of the mold cavity 376, between the inner surfaces 370 of the pre-fabricated blade segments 368 and the displacements 394 that define the conduits of the bit 110. As mentioned, the powders may include one or more matrix powders that are ultrahard materials, such as WC, TiC, or other refractory particles, to increase the hardness or abrasiveness of the drill bit body. In certain embodiments, the powders may additionally or alternatively include one or more filler metal powders (e.g., a steel alloy) or one or more binder metal powders (e.g., a copper or nickel alloy). It is presently recognized that it is desirable for the filler and/or binder metal powders have melting points that are below (e.g., more than 50° C. below, between 100° C. and 300° C. below, or about 15% to 25% below) the melting point of a metallic binder in the pre-fabricated blade segments 368. For example, in an embodiment in which the binder metal of the pre-fabricated blade segments 368 has a melting point between about 900° C. and 1100° C., the filler metal powder may have a melting point of between about 750° C. and 1050° C.

Additionally, in certain embodiments that include both ultrahard and filler metal powders 398, the relative amounts of matrix material (e.g., ultrahard material powder), filler metal powder, and/or binder metal powder may vary in different portions of the mold cavity 376. For example, the first portion powder used to fill the bottom of the mold cavity 376 may be richer in ultrahard material powder than a second portion of powder used to fill an upper portion of the mold cavity 376. It may be appreciated that, by varying the composition of the matrix, filler, and/or binder metal powders, the physical properties of the bit body may be varied, for example, to increase the hardness or abrasiveness of portions of the bit body disposed near the blade segments 368 and increase the machinability or weldability of the bit body near the threaded portion 281 of the bit 110. In some embodiments, 100% steel powder may be used throughout the mold assembly 390. In certain embodiments, a shoulder powder 400 may be deposited in portions of the mold assembly 390 to aid in mold release and/or machining after the casting and infiltration process is complete. It may be appreciated that, for certain embodiments that are bonded exclusively using infiltration, only the one or more matrix material and/or binder metal powders may be added to the mold assembly 390, and no filler metals are used. Additionally, in certain embodiments, the mold 374 may be vibrationally agitated to tamp down and tightly pack the powders 398, 400 disposed within the mold 374 before proceeding.

Constructing the mold assembly 390 also includes optionally disposing a steel blank within the mold assembly 390. For example, as illustrated in FIG. 8A, steel blank 399 is loaded into the mold assembly 390 and surrounded by the one or more powders 398. During the subsequent heating step, the steel blank remains substantially solid and is metallurgically bonded to a molten binder or filler metal of the one or more powdered materials 398 in the mold assembly. As such, in certain embodiments, the steel blank 399 forms the base portion 279 and/or the threaded portion

281 of the completed bit 110, as illustrated in FIG. 3D. In contrast, the mold assembly 390 of FIG. 8B lacks the steel blank 399, and the powder 398 includes steel powder that will be used to form the base portion 279 and/or the threaded portion 281 of the bit 110. When a steel blank 399 is not used, as illustrated in FIG. 8B, and when the powder 398 includes steel and lacks ultrahard matrix particles, the shoulder powder 400 may also be eliminated, as the resulting bit body 212 will be readily machinable in this case. As mentioned, in certain embodiments, the mold assembly 390 may be used to infiltrate 100% metallic powder (e.g., steel powder) with a suitable binder metal (e.g., a copper or nickel alloy). In other embodiments, the mold assembly 390 may be used to melt a both filler metal (e.g., steel alloy powder) and binder metal (e.g., a copper or nickel alloy) and form a casting. For example, in an embodiment, at least an upper portion of the mold assembly 390 (e.g., upwards from the body powder, at and above the funnel ring 392B) may be used to melt both a steel alloy powder filler metal and a copper-based alloy binder metal to cast at least a portion of the bit body 212.

Continuing through the process 360 illustrated in FIG. 5, for embodiments that are formed via infiltration, a binder metal or infiltrant may be added on top of the one or more powders 398 of the mold assembly 390 (block 402). Returning to FIGS. 8A and 8B, a binder metal 404 and an infiltration flux 406 have been added to the top of the mold assembly 390. The binder metal 404 may be copper, nickel, iron, aluminum, zinc, a combination thereof, or any other suitable transition metal or alloy. In certain embodiments, the binder metal 404 has a melting point that is below (e.g., more than 50° C. below, between 100° C. and 300° C. below, or about 15% to 25% below) the melting points of the metallic binder in the pre-fabricated blade segments 368. For example, in an embodiment in which a binder metal of the pre-fabricated blade segments 368 has respective melting points between about 900° C. and 1100° C., the binder metal 404 may have a melting point of between about 750° C. and 1050° C. As mentioned, for embodiments of the bit 110 formed using via casting, as opposed to infiltration, the binder metal 404 is not used, and the actions described by block 402 may be skipped.

Continuing through the embodiment of the process 360 illustrated in FIG. 5, the mold assembly 390 is heated to a sufficient to melt either the binder metal 404, the filler metal within the one or more powders 398, or a combination thereof, without melting the pre-fabricated blade segments 368 (block 408). In certain embodiments, induction heating may be used. For embodiments of the bit 110 formed using infiltration, the mold assembly 390 is heated to a sufficient temperature to melt the binder metal 404, such that the molten binder metal flows down through the length of the mold assembly 390 to bind the ultrahard powder particles, when present, and to superficially bind to the inner surfaces 370 of the pre-fabricated blade segments 368. For embodiments of the bit 110 formed using casting, the assembled mold is heated to a sufficient temperature to melt the filler metal in the powder 398, such that the molten filler metal binds to the ultrahard powder particles, when present, and superficially binds to the inner surfaces 370 of the pre-fabricated blade segments 368. It may be appreciated that, in certain embodiments, the bit 110 may be formed through a combination of casting and infiltration, wherein the mold assembly 390 is heated to a sufficient temperature to melt both the binder metal 404 and filler metal in the powder 398, such that the combination of the molten binder metal and the molten filler metal binds to the ultrahard powder particles in the powder 398, when present, and superficially binds to the inner surfaces 370 of the pre-fabricated blade segments 368. As used herein, the term "superficial" refers to the molten binder metal and/or filler metal only penetrating to a depth of less than 500 micrometers (μm) (e.g., less than 200 μm, less than 100 μm, or only around 30 μm) into the inner surfaces 370 of the pre-fabricated blade segments 368. As such, the pre-fabricated blade segments may be described herein as being "substantially impenetrable" with respect to the molten binder metal and/or filler metal during the casting or infiltration process. After casting and/or infiltration process is complete, the resulting structure may be referred to herein as the fused bit, for clarity.

The embodiment of the process 360 illustrated in FIG. 5 concludes with performing finishing operations to complete manufacturing of the bit 110 (block 410). The finishing operations include allowing the fused bit product of block 408 to cool, and removing the fused bit from the mold 374. In certain embodiments, the mold 374 is sacrificial and is broken to remove the fused bit. After being removed from the mold 374, in certain embodiments, portions of the fused drill bit may be machined or welded to correct manufacturing irregularities and to prepare the bit 110 for use. For example, in certain embodiments, a threaded steel extension may be welded to the base of the bit 110 to provide the threaded portion 281 of the bit. For embodiments of the bit body 212 is formed from a steel alloy, the base of the fused bit 110 may be machined to form the threaded portion 281 of the bit 110. In this case, a further heat treatment is sometimes used for base portion 279 and threaded portion 281, for example, to meet the American Petroleum Institute (API) specification. Additionally, cutting elements 216 may be secured into the pockets 238 of the blade segments 368, for example, using a brazing operation, to form the completed bit 110, as illustrated in FIG. 3D.

Figure 9:
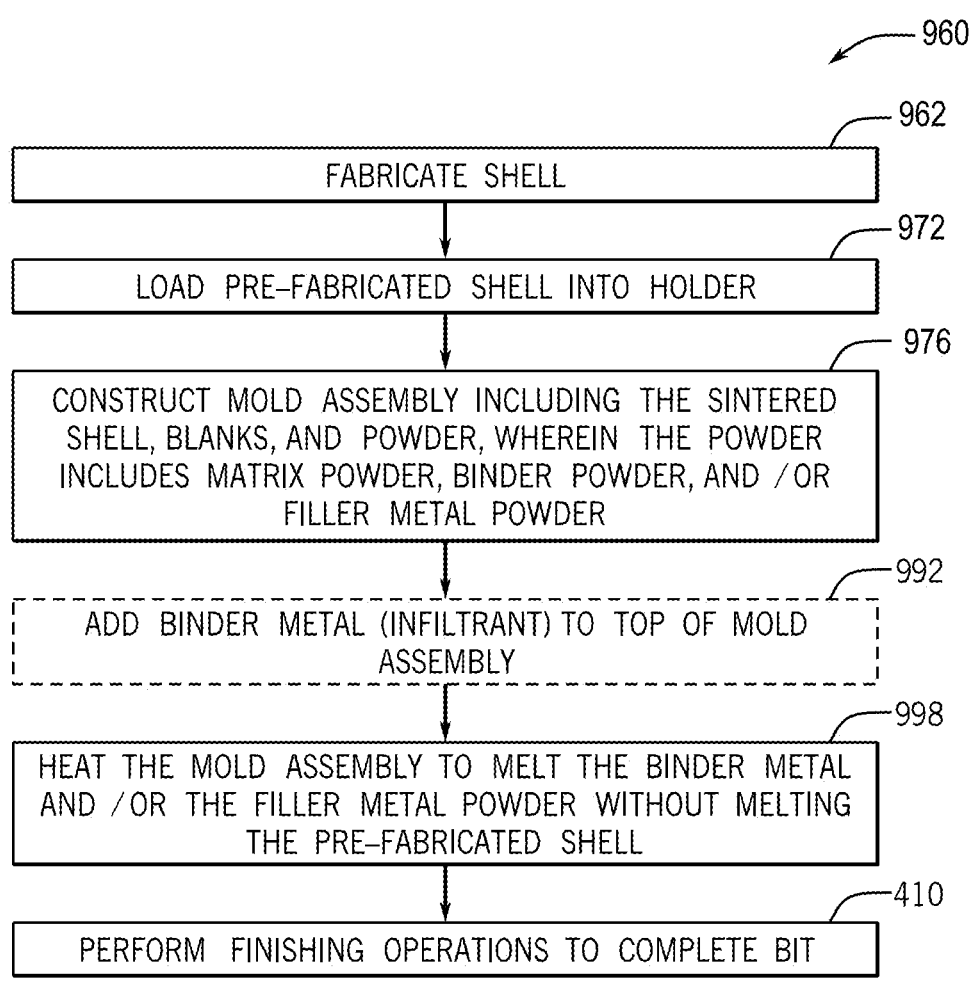
FIG. 9 is a flow diagram illustrating a process for manufacturing a bit, in accordance with embodiments of the present technique.

FIG. 9 is a flow diagram illustrating an embodiment of a process 960 for manufacturing an embodiment of the bit 110 using a metallurgically bonded, pre-fabricated component that is a shell. It may be appreciated that the illustrated process 960 is merely provided as an example, and in other embodiments, the process 960 may include additional steps, repeated steps, omitted steps, and so forth, in accordance with the present disclosure. In certain embodiments, the actions of the process 960 may be manually performed by a human manufacturer, while in other embodiments, at least a portion of the actions of the process 960 may be carried out by one or more processors of a suitable automated manufacturing system. Additionally, the process 960 of FIG. 9 is discussed with reference to elements illustrated in FIGS. 10A-12B. Furthermore, it is noted that there are many similarities in the steps of the process 960 related to a bit or drilling tool having a pre-fabricated component that is a shell, and the steps of the process 360 related to a bit or drilling tool having one or more pre-fabricated components that are blade segments.

For the embodiment illustrated in FIG. 9, the process 960 begins with fabricating the pre-fabricated component (e.g., shell 364) (block 962). For example, FIGS. 10A-10D are views of an embodiment of a pre-fabricated or pre-manufactured shell 364 of a bit 110, wherein the shell 364 defines a number of blades 214 of the bit 110. The pre-fabricated shell 364 may be described as having an outer surface 366, as well as a shell cavity 371 in which the bit body is formed. As mentioned, the shell 364 is made of a suitable component material. For example, in certain embodiments, the component material may include titanium carbide (TiC), tungsten carbide (WC), cast tungsten carbide (WC/W$_2$C), or any other suitable refractory material. In certain embodiments, the component material may be a MMC having a metallic binder, such as nickel-silicon-boron (Ni—Si—B) and copper-zinc-silver (Cu—Zn—Ag). Thus, in certain embodiments, a MMC shell could include a tungsten carbide-nickel (WC+nickel) MMC, a tungsten carbide-copper (WC+copper) MMC, or another suitable MMC having at least one ultrahard material. The illustrated shell 364 may be fabricated using any suitable manufacturing process that yields high-density (e.g., 90%+) parts that include at least one ultrahard material.

For example, in certain embodiments, the shell 364 can be pre-fabricated using an additive manufacturing process, a separate infiltration process (e.g., a mold infiltration process or a green body infiltration process), a hot press process, hot isostatic pressure (HIP) process, or a suitable combination thereof, capable of producing high-density parts from ultrahard materials. For example, in certain embodiments, the shell 364 may be produced using directed energy deposition, in which focused thermal energy in the form of a laser, electron beam (e-beam), or plasma arc is used to melt or soften a suitable material that is subsequently deposited to iteratively form layers of the part. In certain embodiments, the shell 364 may be produced using a binder jetting manufacturing process, in which a liquid binder is iteratively deposited onto layers of a suitable material powder to form a low-density green body part, and then the green body part is subsequently sintered or infiltrated/cemented with a suitable binder metal during a heat treatment to form a high-density, additively manufactured part. Additionally or alternatively, in certain embodiments, a HIP process may be applied to a lower density part to eliminate micropores and enhance the sintering quality. In certain embodiments, the shell 364 may be formed using a powder bed fusion process, also referred to as direct metal laser sintering (DMLS), direct metal laser melting (DMLM), or selective laser melting (SLM), in which focused thermal energy in the form of a laser or electron beam is used to selectively heat and sinter portions of a bed of ultrahard material powder to iteratively form layers of the additively manufactured part.

Regardless of the manufacturing technique used, it is desirable for the pre-fabricated shell 364 to be high-density parts having sintered, infiltrated, and/or cemented ultrahard material particles. For example, in certain embodiments, the pre-fabricated shell 364 may have a density greater than about 90%, such as between 90% and 100%, or about 95%. As such, for the embodiments disclosed herein, when a binder jet additive manufacturing process is used, then the shell 364 is used after sintering, HIP processing, or an infiltration process (e.g., in air or under vacuum), as opposed to using the low-density green body shell that is initially formed. It is presently recognized that, during the later casting or infiltration step to form the bit body, the high-density shell 364 are only superficially penetrated by the molten binder and/or filler metal, as discussed below, to secure the shell within the bit 110. It is further presently recognized that the metallurgical bond can also be enhanced by adding surface abnormalities to increase contact area and/or applying mechanical constraints.

Figures 10A, 10B:
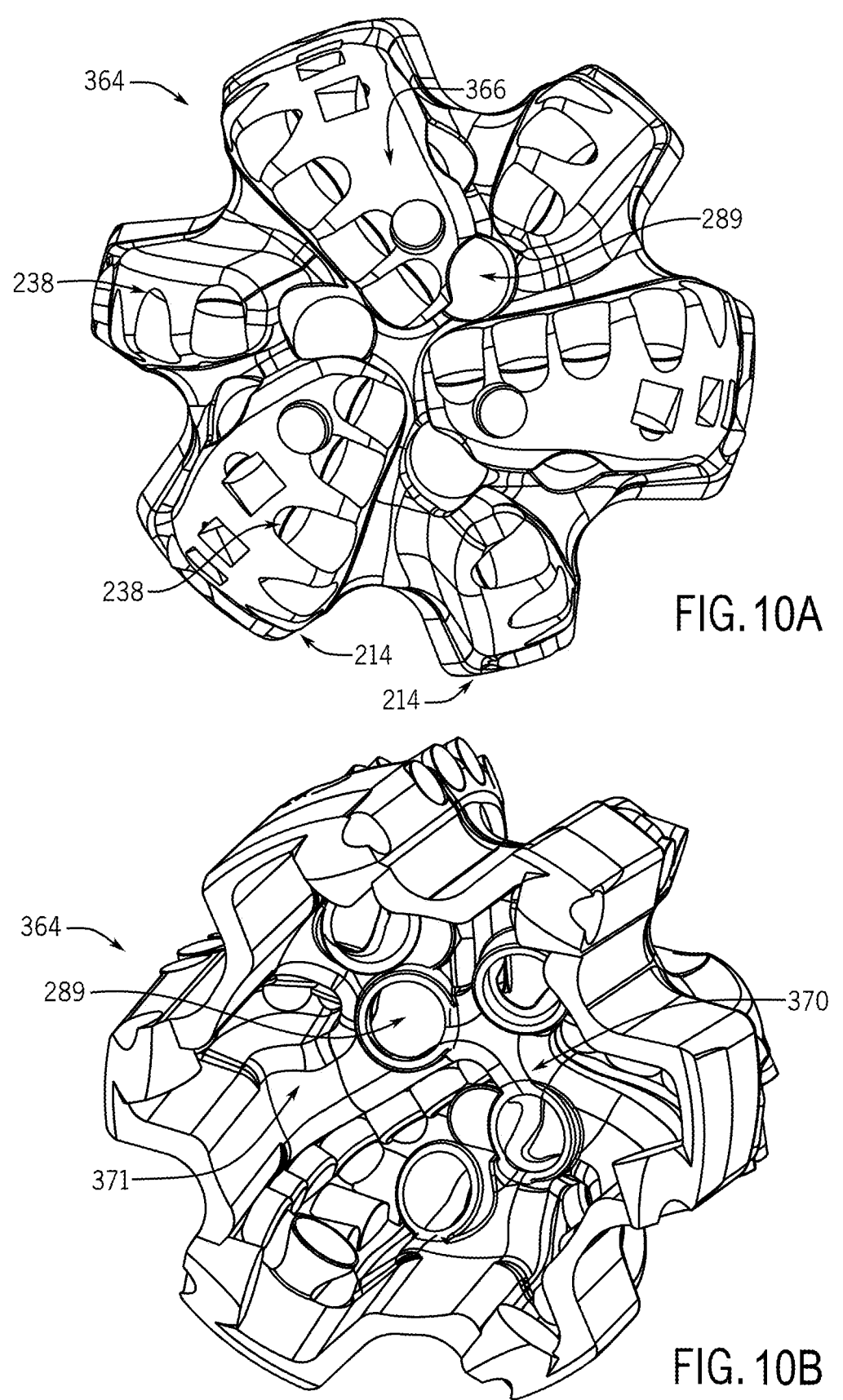
FIGS. 10A and 10B are a perspective views of an embodiment of a pre-fabricated shell, in accordance with embodiments of the present technique.
Figure 10C:
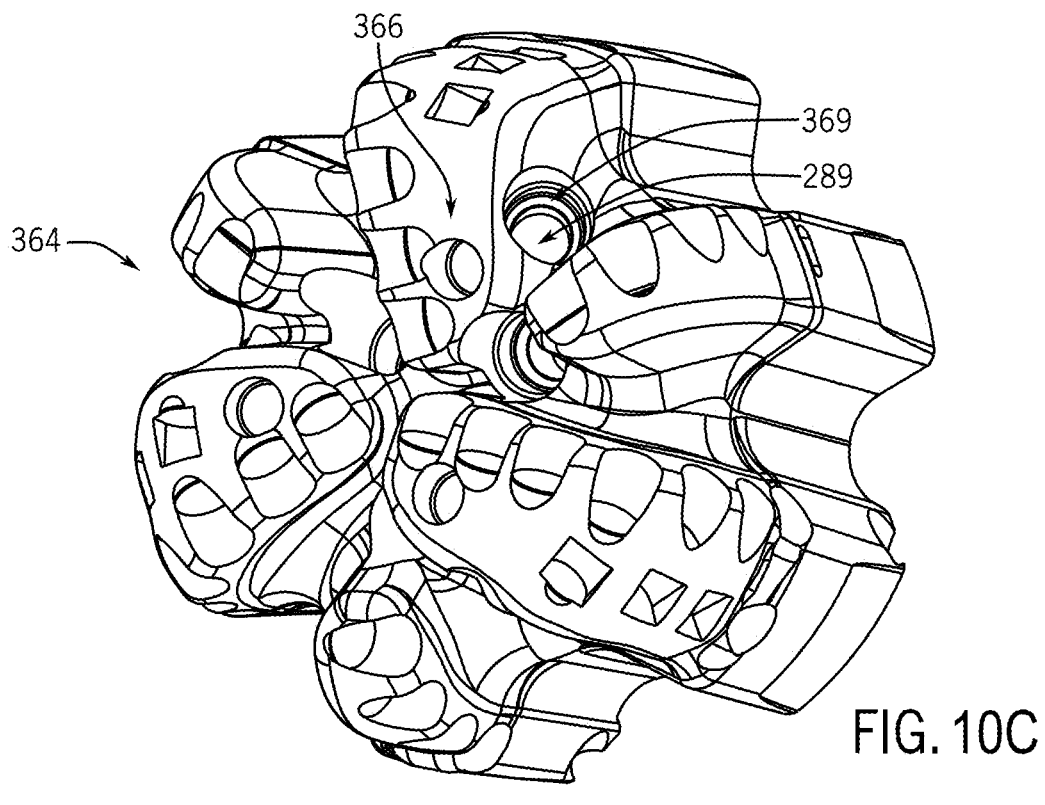
FIGS. 10C and 10D are a perspective views of another embodiment of a pre-fabricated shell that includes flow passages, in accordance with embodiments of the present technique.
Figure 10D:
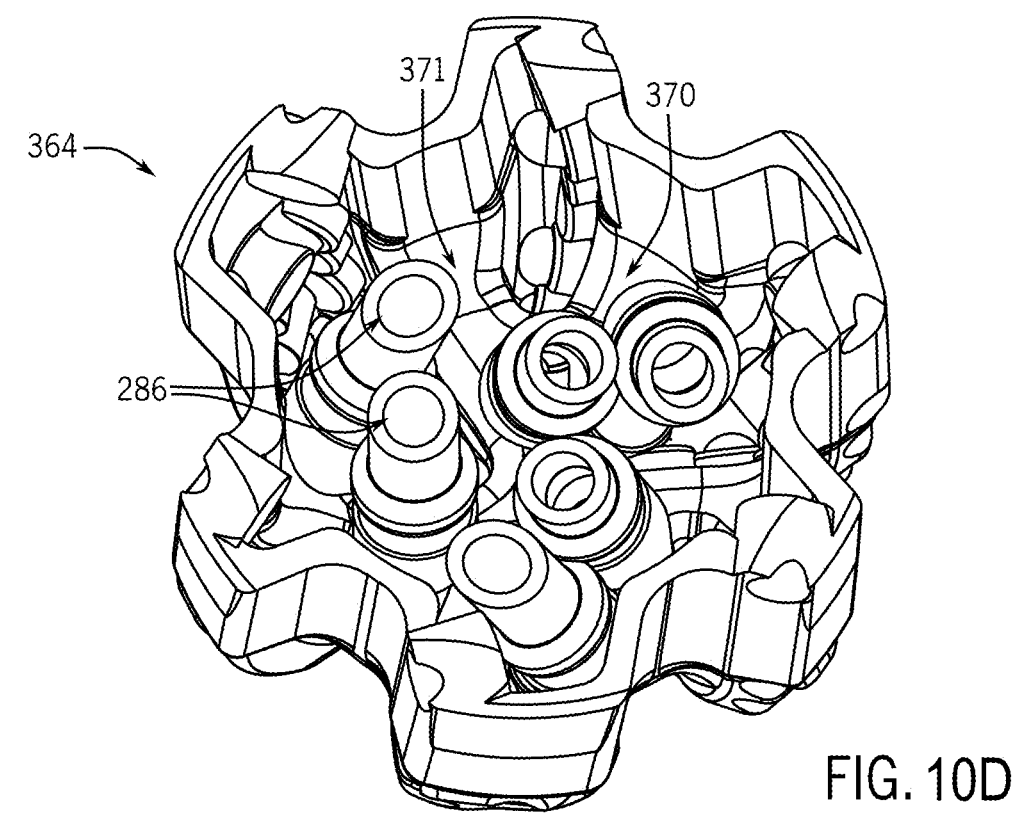

The shell 364 illustrated in FIGS. 10A and 10B also includes a number of fluid outlets 289 that are designed to be coupled to the flow passages 286 of the bit 110, as discussed above with respect to FIG. 4. In other embodiments, the fluid outlets 289 may be positioned differently, and any suitable number of outlets may be present. In other embodiments, the shell 364 is fabricated with all or part of the flow passages 286. The flow passages 286 may be curved, positioned differently and oriented differently to optimize the flow speed. For example, FIGS. 10A and 10B illustrate another embodiment of the shell 364 having curved flow passages 286 that are fabricated as part of the shell 364. Furthermore, the fluid outlets 289 of the illustrated embodiment include threads 369 that are fabricated (e.g., printed) as part of the shell 364 that are designed to receive a threaded nozzle 288, as discussed above.

Additionally, in certain embodiments, an inner surface 370 of the shell 364, within the shell cavity 371, may be different from the remainder of the part to enhance bonding between the shell 364 and the molten filler and/or binder metal during the casting or infiltration step discussed below. For example, in certain embodiments, the inner surface 370 of the shell 364 may be modified (e.g., roughened, textured) using a tumbling operation, a peening operation (e.g., laser shock peening and shot peening), or another suitable process to increase a surface area of the inner surface 370 to enhance bonding during the later casting or infiltration process. In certain embodiments, the inner surface 370 of the shell 364 may be manufactured having a surface morphology or surface geometry that enhances interactions and bonding to the filler and/or binder metal during the later casting and infiltration process. For example, in certain embodiments, the inner surface 370 may include micron-scale to millimeter-scale dimples, ridges, troughs, grooves, corrugations, undulations, or other suitable surface features that increase the surface area of the inner surface 370 to enhance surface interactions and bonding. In certain embodiments, the inner surface 370 of the shell 364 may be formed from one or more layers of a material that is different from the ultrahard material that forms the remainder of the shell. In other embodiments, a mixture of filler/binder material could be brushed onto the inner surface 370 of the shell 364 for enhanced bonding. For example, in certain embodiments, the inner surface 370 of the shell 364 may include one or more bonding layers made of a steel or copper alloy that is desirably penetrated by the filler and/or binder metals during the later casting or infiltration process.

Figure 11A:
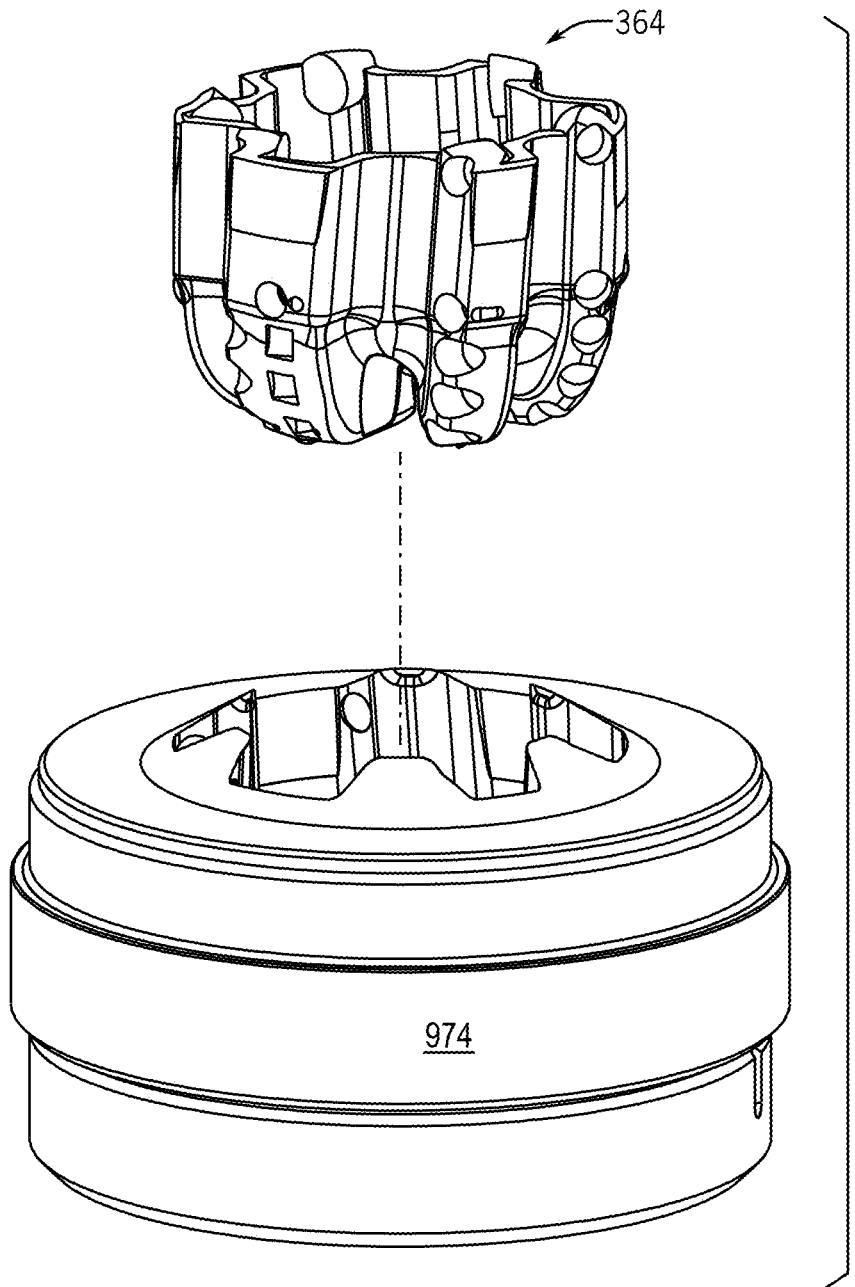
FIGS. 11A, 11B, and 11C are perspective views of the pre-fabricated shell being loaded into a holder, in accordance with embodiments of the present technique.
Figure 11B:
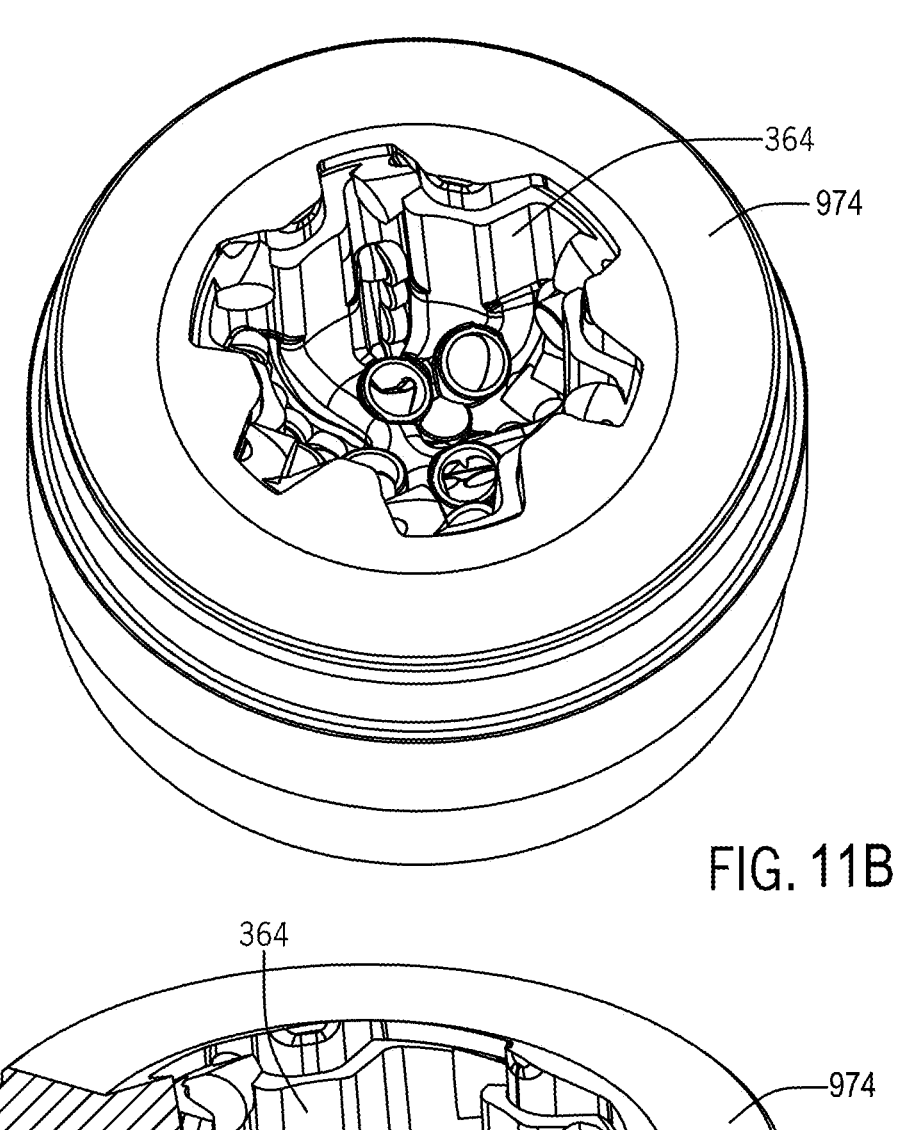
Figure 11C:
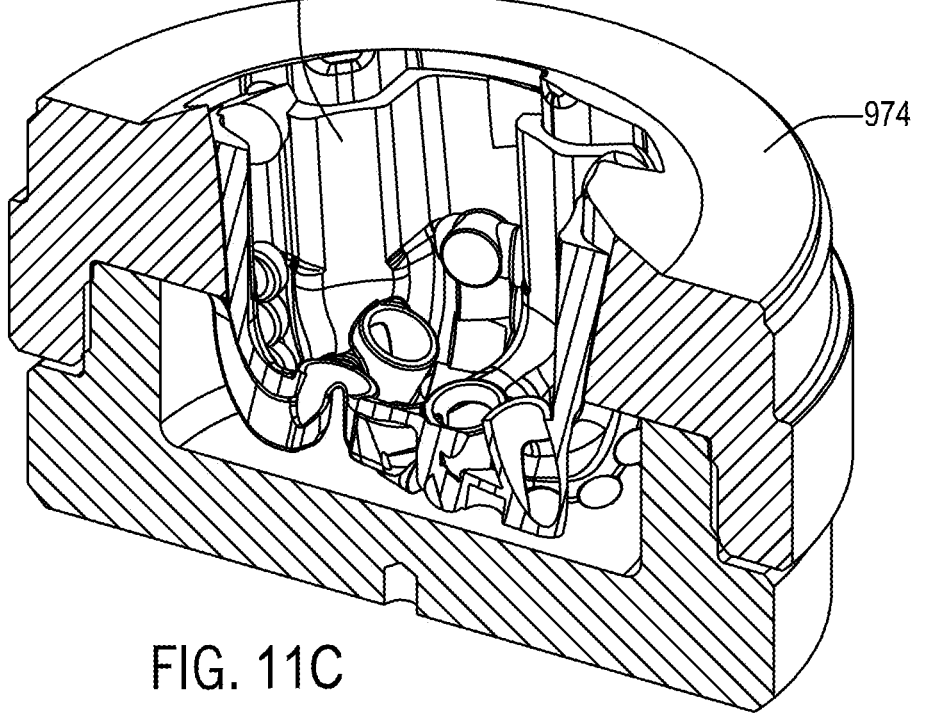

Returning to the embodiment of FIG. 9, the embodiment of the process 960 illustrated in FIG. 9 continues with loading the pre-fabricated shell 364 into a holder 974 (block 972). For example, FIGS. 11A, 11B, and 11C illustrate the loading of the shell 364 into a holder 974. In certain embodiments, the holder 974 may be reusable for multiple melting or infusion runs. The holder 974 may be made of graphite or another suitable material having a high thermal stability and high thermal conductivity. Additionally, as compared to a mold, because the pre-fabricated shell 364 defines an outer surface or crown of the bit 110, the holder 974 may not have a shape that tightly conforms to the complex geometry of the shell 364. That is, as mentioned above, in certain embodiments, the holder 974 may not have the exact complex, three-dimensional structure of the pre-fabricated shell 364. In an example, the holder 974 may be designed to be used with various shell designs having different features, such as the arrangement or orientations of the cutter pockets 238, the shape or geometry of the receptacle of the holder may generally (e.g., not exactly or perfectly) correspond to the complex, three-dimensional geometry of the pre-fabricated shell 364. In particular, in certain embodiments, the holder 974 may not include the cutter pockets 238, which substantially reduces the cost and complexity of the holder 974. In another embodiment, the holder 974 is reusable with different shell designs and, as such, has only rough shapes for the blades and/or junk slots of the bit. It may be appreciated that both the simplicity and the reusability of the mold represents a substantial cost and time savings compared to other bit manufacturing techniques that involve a precisely machined, sacrificial mold. Indeed, in certain embodiments, the holder 974 may not be used and the actions of block 972 may be skipped altogether.

Figure 12A:
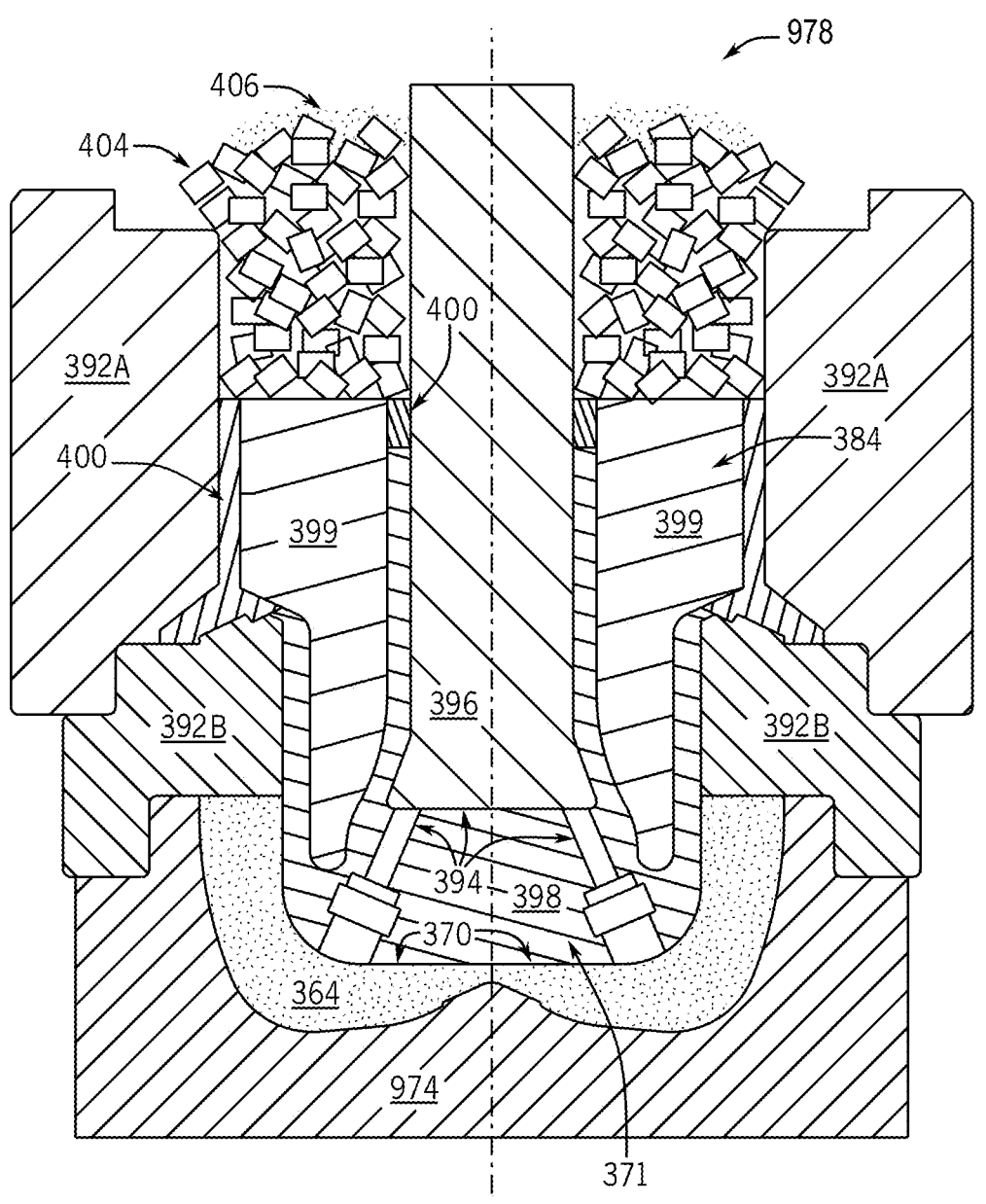
FIG. 12A is a cross-sectional view of an embodiment of a mold assembly for manufacturing an embodiment of the bit using an infiltration process, in accordance with embodiments of the present technique.
Figure 12B:
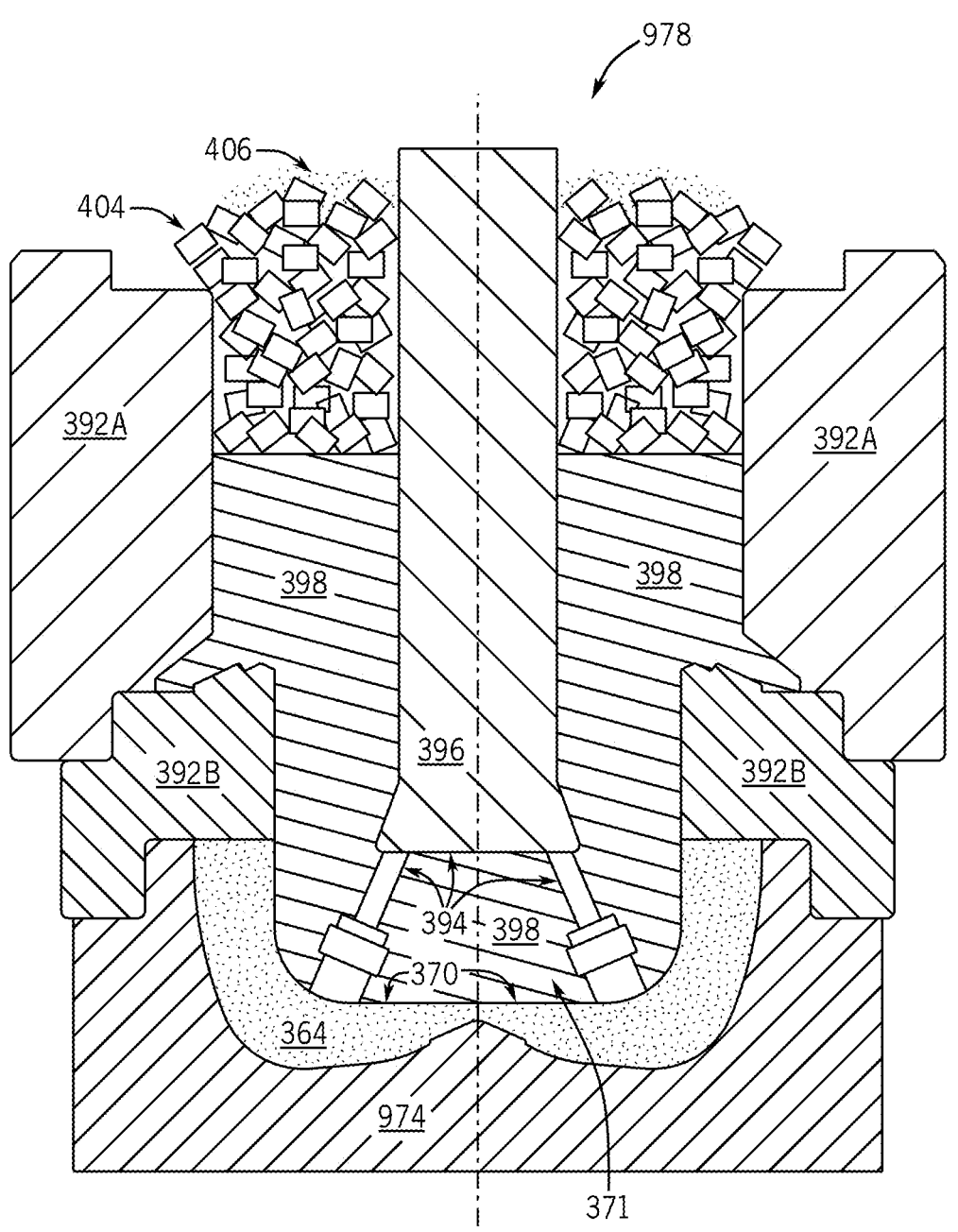
FIG. 12B is a cross-sectional view of another embodiment of a mold assembly for manufacturing an embodiment of the bit using an infiltration process without a steel blank, in accordance with embodiments of the present technique.

Continuing through the embodiment of the process 960 illustrated in FIG. 9, once the pre-fabricated shell 364 has been loaded into the holder 974, in some embodiments a mold assembly may be formed in and around the holder 974 in preparation for the casting or infiltration process (block 976). For example, FIGS. 12A and 12B are cross-sectional views of a mold assembly 978 for embodiments that involve an infiltration process. The illustrated mold assembly 978 includes the holder 974 having the pre-fabricated shell 364 loaded within. The mold assembly 978 further includes one or more funnel rings 392A, 392B that are secured around and above the holder 974 to surround and contain the contents of the mold assembly 978.

Constructing the mold assembly 978 also includes disposing one or more displacements 394 (e.g., resin-bonded sand or graphite displacements) within the shell cavity 371 and the mold assembly cavity 384 to define the internal fluid passages of the bit 110. In certain embodiments, the displacements 394 include a crowfoot-shaped displacement 396 that defines the central conduit 282, including the crowfoot chamber 284, the flow passages 286, and the nozzles or fluid outlets 289 of the bit 110, as illustrated in FIG. 4 above. More specifically, the crowfoot-shaped displacement 396 may be aligned such that the fluid conduits that extend from the blank are aligned with the fluid outlets 289 of the shell 364. It may be appreciated that the displacements are made of a material (e.g., resin bonded sand) to occupy the volume during the later casting or infiltration step, ensuring that the internal fluid passages of the bit 110 remain open and unobstructed. In certain embodiments, the crowfoot-shaped displacement 396 may be prefabricated to include the threaded end portion 281 of the drill bit 110 illustrated in FIG. 3D.

Additionally, constructing the mold assembly 978 illustrated in FIGS. 12A and 12B also includes disposing one or more powdered materials into the shell cavity 371 and mold assembly cavity 384. The one or more powdered materials 398 are added to occupy the volume of these cavities, between the inner surfaces 370 of the pre-fabricated shell 364 and the displacement 394 that define the conduits of the drill bit 110. As mentioned, the powders 398 may include one or more ultrahard material powders, such as WC, TiC, or any other refractory material, to increase the hardness or abrasiveness of the drill bit body. In certain embodiments, the powders 398 may additionally or alternatively include one or more filler metal powders (e.g., a steel alloy) or one or more binder metal powders (e.g., a copper or nickel alloy). It is presently recognized that it is desirable for the filler and/or binder metal powders have melting points that are below (e.g., more than 50° C. below, between 100° C. and 300° C. below, or about 15% to 25% below) the melting point of a metallic binder in the pre-fabricated shell 364. For example, in an embodiment in which the binder metal of the pre-fabricated shell 364 has a melting point between about 900° C. and 1100° C., the filler metal powder may have a melting point of between about 750° C. and 1050° C.

Additionally, in certain embodiments that include both ultrahard and filler metal powders 398, the relative amounts of matrix material (e.g., ultrahard material powder), filler metal powder, and/or binder metal powder may vary in different portions of the cavities 371, 384. For example, the first portion powder used to fill the shell cavity 371 may be richer in ultrahard material powder than a second portion of powder used to fill an upper portion of the mold assembly cavity 384. It may be appreciated that, by varying the composition of the matrix, filler, and/or binder metal powders, the physical properties of the bit body may be varied, for example, to increase the hardness or abrasiveness of portions of the bit body disposed near the shell 364 and increase the machinability or weldability of the bit body near the threaded portion 281 of the bit. In some embodiments, 100% steel powder may be used throughout the mold assembly 978. In certain embodiments, a shoulder powder 400 may be deposited in portions of the mold assembly 978 to aid in holder release and/or the machining after the casting or infiltration process. It may be appreciated that, for certain embodiments that are bonded exclusively using infiltration, only the one or more matrix material and/or binder metal powders may be used, and no filler metals are added to the cavities 371, 384. Additionally, in certain embodiments, the mold assembly 978 may be vibrationally agitated to tamp down and tightly pack the powders 398, 400 disposed within the mold assembly 978 before proceeding.

Constructing the mold assembly 978 also includes optionally disposing a steel blank within the mold assembly 978. For example, as illustrated in FIG. 12A, steel blank 399 is loaded into the mold assembly 978 and surrounded by the one or more powders 398, 400. During the subsequent heating step, the steel blank 399 remains substantially solid and is metallurgically bonded to a molten binder or filler metal of the one or more powdered materials 398 in the mold assembly. As such, in certain embodiments, the steel blank 399 forms the base portion 279 and/or the threaded portion 281 of the completed bit 110, as illustrated in FIG. 3D. In contrast, the mold assembly 978 of FIG. 12B lacks the steel blank 399, and the powder 398 includes steel powder that will be used to form the base portion 279 and/or the threaded portion 281 of the bit 110. When a steel blank 399 is not used, as illustrated in FIG. 12B, and when the powder 398 includes steel and lacks ultrahard matrix particles, the shoulder powder 400 may also be eliminated, as the resulting bit body 212 will be readily machinable in this case. As mentioned, in certain embodiments, the mold assembly 978 may be used to infiltrate 100% metallic powder (e.g., steel powder) with a suitable binder metal (e.g., a copper or nickel alloy). In other embodiments, the mold assembly 978 may be used to melt a both filler metal (e.g., steel alloy powder) and binder metal (e.g., a copper or nickel alloy) and form a casting. For example, in an embodiment, at least an upper portion of the mold assembly 978 (e.g., upwards from the body powder, at and above the funnel ring 392B) may be used to melt both a steel alloy powder filler metal and a copper-based alloy binder metal to cast at least a portion of the bit body 212.

Continuing through the process 960 illustrated in FIG. 9, for embodiments that are formed via infiltration, a binder metal or infiltrant is added on top of the one or more powders 398 of the mold assembly 978 (block 992). Returning to FIGS. 12A and 12B, a binder metal 404 and an infiltration flux 406 have been added to the top of the mold assembly 978. The binder metal 404 may be copper, nickel, iron, aluminum, zinc, a combination thereof, or any other suitable transition metal or alloy. The binder metal 404 has a melting point that is below (e.g., more than 50° C. below, between 100° C. and 300° C. below, or about 15% to 25% below) the melting point of the pre-fabricated shell 364. For example, in an embodiment in which the pre-fabricated shell 364 has a melting point between about 900° C. and 1100° C., the binder metal 404 may have a melting point of between about 750° C. and 1050° C. As mentioned, for embodiments of the drill bit 110 formed using via casting, as opposed to infiltration, the binder metal 404 is not used, and the actions described by block 992 may be skipped.

Continuing through the embodiment of the process 960 illustrated in FIG. 9, the mold assembly 978 is heated to a sufficient to melt either the binder metal 404, the filler metal within the one or more powders 398, 400, or a combination thereof, without melting the pre-fabricated shell 364 (block 998). In certain embodiments, induction heating may be used. For embodiments of the bit 110 formed using infiltration, the mold assembly 978 is heated to a sufficient temperature to melt the binder metal 404, such that the molten binder metal flows down through the length of the mold assembly 978 to bind the ultrahard powder particles in the powder 398, when present, and to superficially bind to the inner surfaces 370 of the pre-fabricated shell 364. For embodiments of the bit 110 formed using casting, the assembled mold is heated to a sufficient temperature to melt the filler metal in the powder 398, such that the molten filler metal binds to the ultrahard powder particles in the powder 398, when present, and superficially binds to the inner surfaces 370 of the pre-fabricated shell 364. It may be appreciated that, in certain embodiments, the bit 110 may be formed through a combination of casting and infiltration, wherein the mold assembly 978 is heated to a sufficient temperature to melt both the binder metal 404 and filler metal in the powder 398, such that the combination of the molten binder metal and the molten filler metal binds to the ultrahard powder particles in the powder 398, when present, and superficially binds to the inner surfaces 370 of the pre-fabricated shell 364. As used herein, the term "superficial" refers to the molten binder metal and/or filler metal only penetrating to a depth of less than 500 micrometers (μm) (e.g., less than 200 μm, less than 100 μm, or only around 30 μm) into the inner surfaces 370 of the pre-fabricated shell 364 to secure the shell to the bit body. As such, the pre-fabricated shell 364 may be described herein as being "substantially impenetrable" with respect to the molten binder metal and/or filler metal during the casting or infiltration process. After casting and/or infiltration process is complete, the resulting structure may be referred to herein as the fused bit, for clarity.

The embodiment of the process 960 illustrated in FIG. 9 concludes with performing finishing operations to complete manufacturing of the bit 110 (block 410). The finishing operations include allowing the fused bit product of block 998 to cool, and removing the fused bit from the holder 974 of the mold assembly 978. After being removed from the holder 974, in certain embodiments, portions of the fused drill bit may be machined or welded to correct manufacturing irregularities and to prepare the bit 110 for use. For example, in certain embodiments, a threaded steel extension may be welded to the base of the bit 110 to provide the threaded portion 281 of the bit. For embodiments of the bit body 212 is formed from a steel alloy, the base of the fused bit 110 may be machined to form the threaded portion 281 of the bit 110. In this case, a further heat treatment is sometimes used for base portion 279 and threaded portion 281, for example, to meet the American Petroleum Institute (API) specification. Additionally, cutting elements 216 may be secured into the pockets 238 of the pre-fabricated shell 364, for example, using a brazing operation, to form the completed bit 110, as illustrated in FIG. 3D.

While the embodiments discussed above rely on metallurgical bonding, in other embodiments, the pre-fabricated shell may be directly mounted to a pre-fabricated steel bit body. For example, in certain embodiments, a steel bit body may be machined directly from a bar stock having suitable mechanical properties. A top of the steel bit body may be formed with a suitable geometry that corresponds to the geometry of the inner surface of the pre-fabricated shell, such that the bit body and shell fit together with a suitable mechanical geometry that blocks or prevents the shell from turning or twisting as the bit experiences drilling torque. In certain embodiments, one or more suitable attachment devices (e.g., bolts, screws, pins, etc.) secure the pre-fabricated shell to the steel bit body. For such embodiments, since the attachment devices are removable, the bit can be more easily repaired and maintained. Furthermore, for such embodiments, a universal joint design may be used for the interface between the pre-fabricated shell and steel bit body, such that different shells having various cutting structures can be used in combination with a single, universal bit body design.

The technical effects of the present disclosure include improved drill tools and methods of manufacturing thereof. The disclosed bits have MMC or steel bodies that are formed around one or more pre-fabricated components (e.g., blade segments) or formed within a pre-fabricated component (e.g., shell). The one or more pre-fabricated components may be additively manufactured or conventionally manufactured using either a casting or infiltration process. During the casting or infiltration process to form the bit body, an assembled mold with the pre-fabricated blade segments is heated to a sufficient temperature to melt a low-melting temperature alloy (e.g., steel alloy powder filler metal) or a binder metal, wherein the molten metal superficially interacts with the inner surfaces of the pre-fabricated components to form a metallurgical bond (e.g., a permanent or non-removable attachment) to secure the pre-fabricated components with the bit body. Unlike traditional MMC drill bits, because at least a portion of the outer surfaces of the drill bit (e.g., the blades) are formed from the pre-fabricated components, it is recognized that the properties of these outer surfaces is dependent on the manufacturing process used to fabricate the components and is not dependent on the quality of the infiltration or melt process used to form the bit body. Additionally, using pre-fabricated components and steel alloy powder, an embodiment of a drill bit may be fabricated in which the components enable the desired hardness and erosion resistance to the surface of the bit, while the steel bit body enables toughness and is substantially cheaper to produce than a MMC bit body. Additionally, unlike MMC bit bodies, the steel alloy bit bodies of such embodiments are both machinable and weldable, which may reduce costs and increase the flexibility of the drill bit to be modified or customized for particular applications. While the bit size that utilizes an additively manufactured pre-fabricated shell may be limited by the size or volume capacity of an additive manufacturing system, it is appreciated that the formation of one or more pre-fabricated components (e.g., blade segments) may enable a greater range of bit sizes utilizing pre-fabricated components.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112 (f). However, for any claims containing elements designated in any other manner, it is intended that such elements are not to be interpreted under 35 U.S.C. § 112 (f).

The invention claimed is:

1. A method of manufacturing a bit, comprising:

disposing one or more pre-fabricated components into a cavity of a structure, wherein the one or more pre-fabricated components comprise a first ultrahard material and a first metallic binder and have a density of at least 90%, and the structure comprises a mold or holder;

disposing a powder comprising a second ultrahard material, a binder metal, and a filler metal, in contact with inner surfaces of one or more pre-fabricated components;

heating the structure to melt the binder metal and the filler metal to form molten metal, without melting the first metallic binder in the one or more pre-fabricated components, wherein the molten metal superficially penetrates the inner surfaces of the one or more pre-fabricated components to metallurgically bind the one or more pre-fabricated components; and removing the structure to release the bit after cooling.

2. The method of claim 1, comprising:

performing a manufacturing process to form the one or more pre-fabricated components, wherein the manufacturing process comprises a directed energy deposition process, a binder jetting manufacturing process that includes sintering or infiltration, a selective laser melting (SLM) manufacturing process, or an electron beam melting (EBM) manufacturing process.

3. The method of claim 1, comprising:

fabricating the mold by machining a refractory material to define a mold cavity having one or more blade segment receptacles, wherein the one or more pre-fabricated components comprise one or more blade segments, and disposing the one or more pre-fabricated components into the cavity of the structure comprises disposing the one or more blade segments into corresponding blade segment receptacles.

4. The method of claim 1, comprising:

disposing a displacement at least partially in the cavity of the structure to define a fluid conduit of the bit.

5. The method of claim 1, comprising:

disposing the binder metal in or on the powder prior to heating, wherein the binder metal is configured to melt and infiltrate the powder to form a metal matrix composite (MMC) bit body and to superficially penetrate the inner surfaces of the one or more pre-fabricated components during heating.

6. The method of claim 1, wherein the filler metal includes a steel alloy filler metal, and wherein the steel alloy filler metal is configured to melt and superficially penetrate the inner surfaces of the one or more pre-fabricated components during heating.

7. The method of claim 1, wherein the binder metal is configured to melt and bond the second ultrahard material to form a MMC bit body during heating.

8. The method of claim 1, comprising:

after removing the bit from the mold, brazing a plurality of cutting elements into a corresponding plurality of pockets defined in an outer surface of the one or more pre-fabricated components.

9. A bit for removing material from a formation, the bit comprising:

a bit body comprising a first ultrahard material and a metal alloy including a binder metal and a filler metal, wherein the bit body comprises a plurality of blade portions extending from the bit body; and a plurality of pre-fabricated components that are configured to attach to the plurality of blade portions, wherein each of the plurality of pre-fabricated components comprises a second ultrahard material and a metallic binder having a higher melting point than the binder metal and the filler metal, and each of the plurality of pre-fabricated components has a density of at least 90%, wherein the plurality of blade portions are metallurgically bound to inner surfaces of the plurality of pre-fabricated components by only a superficial penetration of the metal alloy into the inner surfaces, wherein the bit is formed from the process of claim 1.

10. The bit of claim 9, wherein the plurality of pre-fabricated components comprise a metal matrix composite (MMC), and wherein the MMC includes a tungsten carbide (WC, $W_2C$) as a matrix material and the binder metal.

11. The bit of claim 9, wherein the plurality of pre-fabricated components include pockets, and wherein the pockets include ultrahard cutting elements that are brazed into the pockets.

12. The bit of claim 9, wherein the melting point of the metallic binder is at least 100° C. more than a melting point of the binder metal and the filler metal.

13. The bit of claim 12, wherein the binder metal comprises a copper alloy or a nickel alloy.

14. A mold assembly for manufacturing a bit, the mold assembly comprising:

a machined mold having a mold cavity;

one or more pre-fabricated components comprising a first ultrahard material in a metallic binder disposed in the mold cavity, wherein the one or more pre-fabricated components comprise inner surfaces opposite the machined mold and has a density of at least 90%;

a displacement at least partially disposed within the mold cavity and a portion of the inner surfaces to define a fluid passage of the bit; and a powder disposed on the inner surfaces of the one or more pre-fabricated components within the mold cavity, wherein the powder comprises a second ultrahard material powder, a filler metal powder, and a binder metal powder, wherein the binder metal powder and the filler metal powder have a melting point below a melting point of the metallic binder.

15. The mold assembly of claim 14, wherein the binder metal powder includes a copper alloy or a nickel alloy binder metal disposed on top of the powder or disposed within the powder as the binder metal powder, wherein the mold assembly is configured to be heated to a sufficient temperature for the binder metal to infiltrate the powder and superficially penetrate the inner surfaces of the one or more pre-fabricated components to metallurgically bond the one or more pre-fabricated components to the bit.

16. The mold assembly of claim 14, wherein the filler metal powder comprises steel alloy filler metal powder, and wherein the mold assembly is configured to be heated to a sufficient temperature to melt the steel alloy filler metal powder into molten metal that superficially penetrates the inner surfaces of the one or more pre-fabricated components to metallurgically bond the one or more pre-fabricated components to the bit.

\* \* \* \* \*